（12) United States Patent
Lingwall et al.

(10) Patent No.: US 9,790,992 B1
(45) Date of Patent: Oct. 17, 2017

(54) BEARING ASSEMBLIES INCLUDING INTEGRATED LUBRICATION, BEARING APPARATUSES, AND METHODS OF USE

(71) Applicants: US SYNTHETIC CORPORATION, Orem, UT (US); WAUKESHA BEARINGS CORPORATION, Pewaukee, WI (US)

(72) Inventors: Brent A. Lingwall, Spanish Fork, UT (US); Richard Raymond Shultz, Groton, CT (US); Leonidas C. Leite, Provo, UT (US)

(73) Assignees: WAUKESHA BEARINGS CORPORATION, Pewaukee, WI (US); US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/492,301

(22) Filed: Apr. 20, 2017

Related U.S. Application Data

(63) Continuation of application No. 15/073,461, filed on Mar. 17, 2016, now Pat. No. 9,644,676, which is a
(Continued)

(51) Int. Cl.
*F16C 17/02* (2006.01)
*F16C 17/04* (2006.01)
(Continued)

(52) U.S. Cl.
CPC ............ *F16C 33/24* (2013.01); *F16C 17/04* (2013.01); *F16C 33/043* (2013.01);
(Continued)

(58) Field of Classification Search
CPC .......... F16C 17/03; F16C 17/35; F16C 17/06; F16C 17/065; F16C 17/26; F16C 33/043; F16C 33/1025; F16C 33/104; F16C 33/108; F16C 33/24; F16C 2202/50; F16C 2202/52; F16C 2202/54; F16C 2206/04
See application file for complete search history.

(56) References Cited

U.S. PATENT DOCUMENTS 4,337,985 A * 7/1982 Gerling ................. F16C 17/03
384/132
4,468,138 A 8/1984 Nagel
(Continued)

FOREIGN PATENT DOCUMENTS

FR 1558297 A * 2/1969 ............. E21B 10/22

OTHER PUBLICATIONS

U.S. Appl. No. 13/275,372, filed Oct. 18, 2011, Mukhopadhyay et al.
(Continued)

*Primary Examiner* — Phillip A Johnson
(74) *Attorney, Agent, or Firm* — Dorsey & Whitney LLP

(57) ABSTRACT

Embodiments disclosed herein are directed to bearing assemblies that include integrated lubrication, bearing apparatuses including such bearing assemblies, and related methods. For example, a lubricated bearing assembly may include a lubricant that may lubricate the bearing surface thereof during operation of the lubricated bearing assembly and/or bearing apparatus including the lubricated bearing assembly.

20 Claims, 10 Drawing Sheets

Related U.S. Application Data continuation of application No. 14/562,275, filed on Dec. 5, 2014, now Pat. No. 9,309,923.

(51) Int. Cl.
*F16C 33/10* (2006.01)
*F16C 33/24* (2006.01)
*F16C 33/04* (2006.01)

(52) U.S. Cl.
CPC ...... *F16C 2204/46* (2013.01); *F16C 2206/02* (2013.01); *F16C 2352/00* (2013.01)

(56) References Cited

U.S. PATENT DOCUMENTS

| | | | |
|---|---|---|---|
| 4,720,199 A | 1/1988 | Geczy et al. | |
| 4,789,251 A | 12/1988 | McPherson et al. | |
| 5,092,687 A | 3/1992 | Hall | |
| 5,253,939 A | 10/1993 | Hall | |
| 5,342,129 A | 8/1994 | Dennis et al. | |
| 5,693,994 A * | 12/1997 | New | F16C 32/0442 |
| | | | 29/898.06 |
| 5,707,718 A * | 1/1998 | Matsukawa | F16C 17/026 |
| | | | 384/108 |
| 5,743,654 A | 4/1998 | Ide et al. | |
| 6,190,050 B1 | 2/2001 | Campbell | |
| 6,460,635 B1 * | 10/2002 | Kalsi | E21B 10/22 |
| | | | 175/229 |
| 6,746,152 B2 | 6/2004 | Branagan | |
| 7,255,480 B2 | 8/2007 | John et al. | |
| 7,533,740 B2 | 5/2009 | Zhang et al. | |
| 7,866,418 B2 | 1/2011 | Bertagnolli et al. | |
| 7,971,663 B1 | 7/2011 | Vail | |
| 7,998,573 B2 | 8/2011 | Qian et al. | |
| 8,034,136 B2 | 10/2011 | Sani | |
| 8,236,074 B1 | 8/2012 | Bertagnolli et al. | |
| 8,480,304 B1 | 7/2013 | Cooley et al. | |
| 8,561,727 B1 | 10/2013 | Pope et al. | |
| 8,807,837 B1 | 8/2014 | Gonzalez et al. | |
| 8,814,434 B1 | 8/2014 | Sexton | |
| 9,309,923 B1 | 4/2016 | Lingwall et al. | |
| 9,523,386 B1 | 12/2016 | Gonzalez et al. | |
| 2006/0171616 A1 * | 8/2006 | Richie | F16C 17/065 |
| | | | 384/121 |
| 2006/0288579 A1 | 12/2006 | Luo et al. | |
| 2007/0131459 A1 | 6/2007 | Voronin et al. | |
| 2009/0097788 A1 | 4/2009 | Cooley et al. | |
| 2010/0218995 A1 | 9/2010 | Sexton et al. | |
| 2011/0174544 A1 | 7/2011 | Scott et al. | |
| 2012/0039551 A1 | 2/2012 | Cooley et al. | |
| 2012/0225253 A1 | 9/2012 | DiGiovanni et al. | |
| 2012/0225277 A1 | 9/2012 | Scott | |
| 2013/0044971 A1 | 2/2013 | Cooley et al. | |
| 2014/0023301 A1 | 1/2014 | Sexton et al. | |
| 2014/0241654 A1 | 8/2014 | Cooley et al. | |

OTHER PUBLICATIONS

U.S. Appl. No. 13/027,954, filed Feb. 15, 2011, Miess et al.
U.S. Appl. No. 13/100,388, filed May 4, 2011, Jones et al.
U.S. Appl. No. 14/562,165, filed Dec. 5, 2014, Gonzalez et al.
U.S. Appl. No. 14/462,275, filed Dec. 5, 2014, Lingwall et al.
U.S. Appl. No. 15/073,461, filed Mar. 17, 2016, Lingwall et al.
Erdemir, "Solid Lubricants and Self-Lubricating Films", Modern Tribology Handbook, Chapter 22, 18 pages, (2001).
Henze, "Dry Lubrication" http://www.henze-bnp.de/html/eng/boron_nitride/properties/dry_lubricating_properties.php, Accessed Apr. 30, 2014.
Henze, "Technical Bornon Nitride Applications—Overview" http//www.henze-bnp.de/html/eng/boron_nitride_products/boron_nitride_applications.php, Accessed Apr. 30, 2014.
U.S. Appl. No. 14/562,275, Dec. 4, 2015, Notice of Allowance.
U.S. Appl. No. 14/562,275, Mar. 23, 2016, Issue Notification.
U.S. Appl. No. 14/562,165, Apr. 15, 2016, Office Action.
U.S. Appl. No. 14/562,165, Aug. 12, 2016, Notice of Allowance.
U.S. Appl. No. 14/562,165, Dec. 20, 2016, Issue Notification.
U.S. Appl. No. 15/073,461, May 25, 2016, Notice of Allowance.
U.S. Appl. No. 15/073,461, Aug. 24, 2016, Office Action.

* cited by examiner

BEARING ASSEMBLIES INCLUDING INTEGRATED LUBRICATION, BEARING APPARATUSES, AND METHODS OF USE

CROSS-REFERENCE TO RELATED APPLICATIONS

This application is a continuation of U.S. application Ser. No. 15/073,461 filed on 17 Mar. 2016, which is a continuation of U.S. application Ser. No. 14/562,275 filed on 5 Dec. 2014. The disclosure of each of the foregoing applications is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments disclosed herein are directed to bearing assemblies that include integrated lubrication, bearing apparatuses including such bearing assemblies, and related methods. For example, a lubricated bearing assembly may include a lubricant that may lubricate bearing surfaces thereof during operation of the lubricated bearing assembly and/or bearing apparatus including the lubricated bearing assembly. Additionally or alternatively, the lubricant included in the lubricated bearing assembly may cool one or more elements or components of the lubricated bearing assembly during operation.

One or more embodiments relate to a bearing assembly that includes a support ring and a plurality of superhard bearing elements mounted on the support ring. Each of the plurality of superhard bearing elements includes a superhard bearing surface. The bearing assembly includes one or more lubricant bodies moveable relative to the superhard bearing surfaces of the plurality of superhard bearing elements. Each of the one or more lubricant bodies includes a lubrication surface. The bearing assembly also includes one or more biasing elements positioned under at least one of the one or more lubricant bodies. The biasing elements are configured to move the lubricant body(s) away from the support ring.

Embodiments also include a bearing apparatus that has a first bearing assembly and a second bearing assembly. The first bearing assembly includes one or more bearing surfaces. The second bearing assembly includes a plurality of superhard bearing surfaces and one or more lubricant bodies. Each lubricant body includes a lubrication surface. The lubricant bodies are movable relative to the superhard bearing surfaces. The second bearing assembly also includes one or more biasing elements configured to move at least one of the one or more lubricant bodies relative to the superhard bearing surfaces.

Embodiments are also directed to a method of operating a bearing apparatus. The method includes producing a relative rotation between a first bearing assembly and a second bearing assembly, while maintaining first superhard bearing surfaces of the first bearing assembly engaged with second superhard bearing surfaces of the second bearing assembly. The method also includes forcing a lubrication surface of one or more lubricant bodies toward the second bearing assembly. Moreover, the method further includes transferring lubricant from the one or more lubricant bodies to the first superhard bearing surfaces and the second superhard bearing surfaces.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments disclosed herein are directed to bearing assemblies that include integrated lubrication, bearing apparatuses including such bearing assemblies, and related methods. For example, a lubricated bearing assembly may include a lubricant that may lubricate bearing surfaces thereof during operation of the bearing assembly and/or the bearing apparatus including such bearing assembly. Additionally or alternatively, the lubricant included in the bearing assembly may cool one or more elements or components of the bearing assembly during operation.

In some embodiments, the lubricant may be included or contained in one or more bearing elements of the bearing assembly. In alternative or additional embodiments, the lubricant may be included in or mounted to a support ring of the bearing assembly that supports superhard bearing elements. For example, wear at the bearing surfaces of the bearing assembly may expose new or additional lubricant to the bearing surface of the bearing assembly and/or to an opposing bearing surface. In any event, in an embodiment, the lubricant may be exposed or provided to one or more bearing surfaces during operation of the bearing assembly.

In an embodiment, the lubricant may be advance, forced, or otherwise removed from a first bearing assembly toward and/or onto a second bearing assembly and vice versa. For example, lubricant may be removed in response to temperature changes in the first bearing assembly, temperature changes in the second bearing assembly, temperature changes in the lubricant, or combinations thereof, which may occur during operation. The lubricant may be fed, forced, removed, or otherwise promoted toward and/or onto a bearing surface that opposes the lubricant surface as the first and second bearing assemblies rotate or move relative to each other.

Figure 1A:
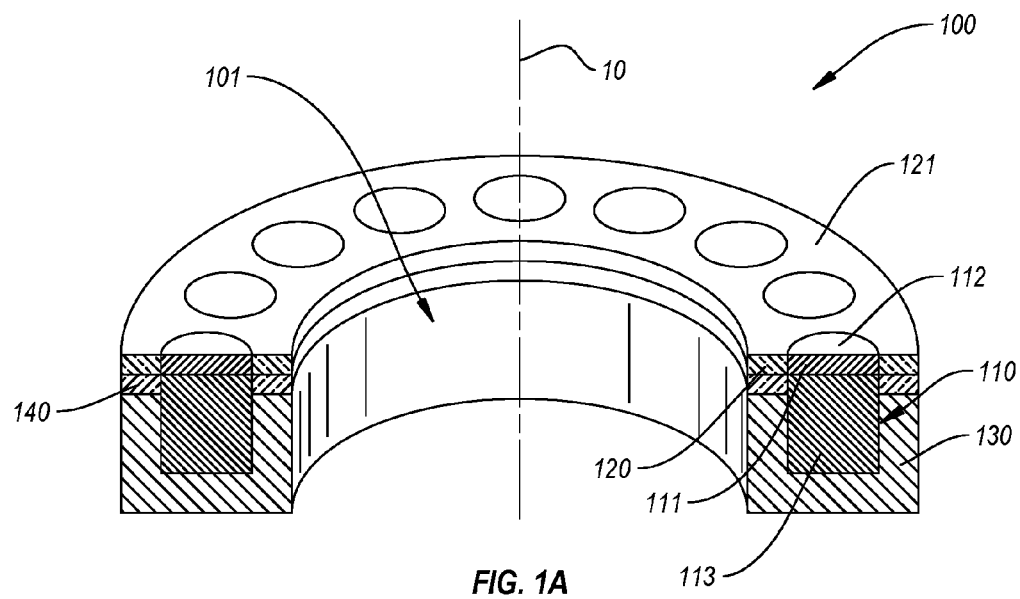
FIG. 1A is an isometric cutaway view of a thrust-bearing bearing assembly according to an embodiment.
Figure 1B:
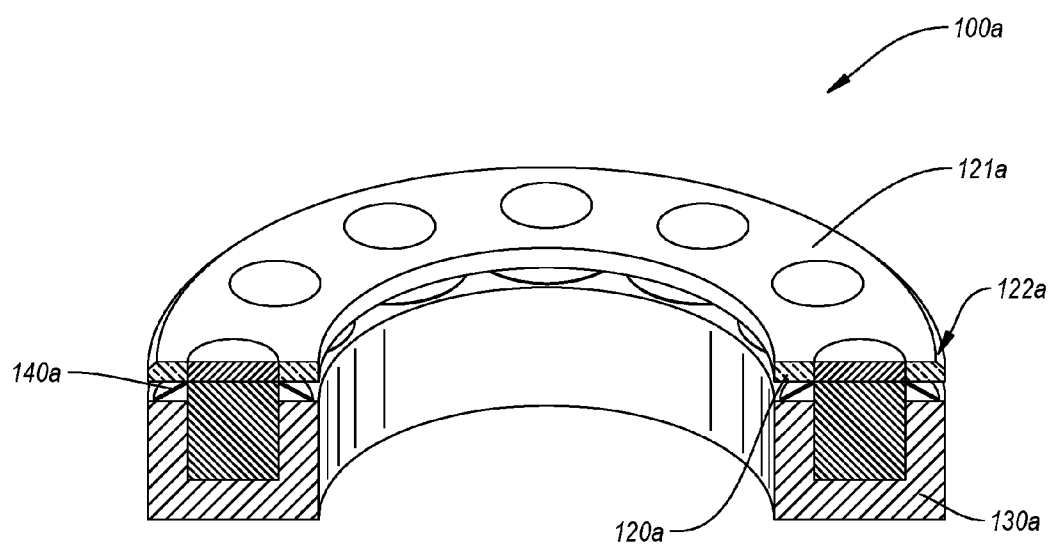
FIG. 1B is an isometric cutaway view of a thrust-bearing bearing assembly according to another embodiment.

FIGS. 1A-1B illustrate bearing assemblies 100, 100a that include superhard bearing elements 110 at least partially laterally surrounded by lubricant according to one or more embodiments. FIG. 1A illustrates the thrust-bearing assembly 100 that includes superhard bearing elements 110 (not all labeled) laterally surrounded by a lubricant body 120. In an embodiment, all of the superhard bearing elements 110 may be laterally surrounded by the lubricant body 120, and may be mounted on a support ring 130. For example, each of the superhard bearing elements 110 may include a superhard table 111 that has a superhard bearing surface 112, and the lubricant body 120 may laterally surround each and every superhard table 111 of the superhard bearing elements 110.

In some embodiments, the lubricant body 120 may include openings that are located to correspond to the location of the superhard bearing elements 110, through which portions of the superhard bearing elements 110 may pass through. Generally, the superhard bearing elements 110 may have any suitable peripheral surface and/or shape that may be defined thereby. In some embodiments, the superhard bearing elements 110 may have approximately cylindrical shapes, and the openings in the lubricant body 120 may be approximately circular in order to correspond with the cylindrical shapes of the superhard bearing elements 110. The superhard bearing elements may have any number of suitable cross-sectional shapes (e.g., trapezoidal, circular, rectangular, etc.), and the openings in the lubricant body 120 may have corresponding shapes and size, such as to allow the superhard bearing elements 110 to pass therethrough.

In some embodiments, the superhard bearing elements 110 may have a close fit within the openings in the lubricant body 120. For example, the superhard bearing elements 110 may be press-fit in the openings in the lubricant body 120. In an embodiment, the superhard bearing elements 110 may fit within the openings in the lubricant body 120, such that the thrust-bearing assembly 100 may include a clearance gap between the lubricant body 120 and the superhard bearing elements 110 (e.g., the gap may be 0.010", 0.020", 0.100", etc.).

In some embodiments, the superhard bearing elements 110 also may include a substrate 113. For example, the superhard table 111 may comprise polycrystalline diamond and the substrate 113 may comprise a cemented carbide, such as tungsten carbide. For example, the superhard table 111 may be bonded to the substrate 113.

In an embodiment, the superhard table 111 may comprise polycrystalline diamond and the substrate 113 may comprise cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise have a metallic infiltrant removed to a selected depth from a working surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of bearing elements, methods for fabricating the bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 µm and about 15 µm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard cutting elements may be freestanding (e.g., substrateless) and/or formed from a polycrystalline diamond body that is at least partially or fully leached to remove a metal-solvent catalyst initially used to sinter the polycrystalline diamond body.

As noted above, the superhard table 111 may be bonded to the substrate 113. For example, the superhard table 111 comprising polycrystalline diamond may be at least partially leached and bonded to the substrate 113 with an infiltrant exhibiting a selected viscosity, as described in U.S. patent application Ser. No. 13/275,372, entitled "Polycrystalline Diamond Compacts, Related Products, And Methods Of Manufacture," the entire disclosure of which is incorporated herein by this reference. In an embodiment, an at least partially leached polycrystalline diamond table may be fabricated by subjecting a plurality of diamond particles (e.g., diamond particles having an average particle size between 0.5 µm to about 150 µm) to an HPHT sintering process in the presence of a catalyst (e.g., from a substrate), such as cobalt, nickel, iron, or an alloy of any of the preceding metals to facilitate intergrowth between the diamond particles and form a polycrystalline diamond table comprising bonded diamond grains defining interstitial regions having the catalyst disposed within at least a portion of the interstitial regions. The as-sintered polycrystalline diamond table may be leached (e.g., after removal from substrate) by immersion in an acid or subjected to another suitable process to remove at least a portion of the catalyst from the interstitial regions of the polycrystalline diamond table, as described above. The at least partially leached polycrystalline diamond table includes a plurality of interstitial regions that were previously occupied by a catalyst and form a network of at least partially interconnected pores. In an embodiment, the sintered diamond grains of the at least partially leached polycrystalline diamond table may exhibit an average grain size of about 20 µm or less. Subsequent to leaching the polycrystalline diamond table, the at least partially leached polycrystalline diamond table may be bonded to a substrate in an HPHT process via an infiltrant with a selected viscosity. For example, an infiltrant may be selected that exhibits a viscosity that is less than a viscosity typically exhibited by a cobalt cementing constituent of typical cobalt-cemented tungsten carbide substrates (e.g., 8% cobalt-cemented tungsten carbide to 13% cobalt-cemented tungsten carbide).

Additionally or alternatively, the superhard table 111 may be a polycrystalline diamond table that has a thermally-stable region, having at least one low-carbon-solubility material disposed interstitially between bonded diamond grains thereof, as further described in U.S. patent application Ser. No. 13/027,954, entitled "Polycrystalline Diamond Compact Including A Polycrystalline Diamond Table With A Thermally-Stable Region Having At Least One Low-Carbon-Solubility Material And Applications Therefor," the entire disclosure of which is incorporated herein by this reference. The low-carbon-solubility material may exhibit a melting temperature of about 1300° C. or less and a bulk modulus at 20° C. of less than about 150 GPa. The low-carbon-solubility, in combination with the high diamond-to-diamond bond density of the diamond grains, may enable the low-carbon-solubility material to be extruded between the diamond grains and out of the polycrystalline diamond table before causing the polycrystalline diamond table to fail during operations due to interstitial-stress-related fracture.

In some embodiments, the polycrystalline diamond, which may form the superhard table, may include bonded-together diamond grains having aluminum carbide disposed interstitially between the bonded-together diamond grains, as further described in U.S. patent application Ser. No. 13/100,388, entitled "Polycrystalline Diamond Compact Including A Polycrystalline Diamond Table Containing Aluminum Carbide Therein And Applications Therefor," the entire disclosure of which is incorporated herein by this reference.

As described above, generally, the superhard bearing elements 110 may be secured to a support ring 130 of the thrust-bearing assembly 100 in any number of suitable ways, such as by brazing, press-fitting, threadedly attaching, fastening with a fastener, combinations of the foregoing, or other suitable techniques. Similarly, the lubricant body 120 may be attached or secured to the support ring 130 in any number of suitable ways. For example, as described above, the lubricant body 120 may be press-fit over superhard table 111 of the superhard bearing elements 110, brazed, adhered (e.g., with glue, epoxy, etc.) to one or more surfaces of the support ring 130, threadedly fastened, combinations thereof, or other suitable technique. For example, the support ring 130 may be manufactured from steel (e.g., alloy, tool steel, etc.), stainless steel, cemented carbide (e.g., cobalt-cemented tungsten carbide), or combinations thereof, etc.

Furthermore, the superhard bearing elements 110 may be arranged on the support ring 130 in any number of suitable configurations. For example, the superhard bearing elements 110 may form a single row or multiple rows extending about a rotation axis 10 of the thrust-bearing assembly 100. Furthermore, the superhard bearing surfaces 112 of the superhard bearing elements 110 may be substantially coplanar with one another (e.g., the superhard bearing surfaces may lie in a plane approximately perpendicular to the rotation axis 10).

In an embodiment, the support ring 130 of the thrust-bearing assembly 100 may include an opening 101 that may accommodate a shaft or a similar machine element or component. For example, the shaft may be secured to the support ring 130 inside the opening 101. In some embodiments, the opening 101 may be approximately cylindrical. However, the shape of the opening 101 may vary from one embodiment to the next and may be sized and configured to accept a shaft or a similar element or component of any suitable shape and size.

In an embodiment, the lubricant body 120 may include a lubrication surface 121. For example, the lubrication surface 121 may be approximately planar. In an embodiment, the lubrication surface 121 may be approximately perpendicular to the rotation axis 10. For example, the lubrication surface 121 may be approximately coplanar with one or more of the superhard bearing surfaces 112.

In an embodiment, the lubrication surface 121 and the superhard bearing surfaces 112 may collectively form a substantially continuous or uninterrupted surface. In some embodiments, as mentioned above, the openings in the lubricant body 120 may sufficiently bigger than the superhard bearing elements 110, such as to form gaps therebetween. For example, a surface defined by the superhard bearing surfaces 112 and by the lubrication surface 121 may include gaps or other discontinuities.

The lubricant body 120 may include or be made from any suitable lubricant or combination of multiple lubricants or multiple lubricant bodies. In some embodiments, the lubricant body 120 may include a dry and/or solid lubricant, such as graphite, hexagonal boron nitride ("HBN"), tungsten disulfide, molybdenum disulfide, combinations thereof, or other suitable lubricant. Moreover, the lubricant body 120 may be substantially uniform or monolithic (e.g., the lubricant body 120 may include multiple particles, such as carbon powder, secured together by a matrix or binder). In an embodiment, the lubricant body 120 may include loose and/or compressed and/or bonded together particles (e.g., powder). In some embodiments, the lubricant body 120 may be preformed (e.g., a solid plate of HBN or graphite) that may be fastened or brazed to the support ring 130. In some embodiments, as opposing bearing surface moves relative to and in contact with the lubrication surface 121, some of the lubricant from the lubricant body 120 may be removed onto the opposing bearing surface and/or onto the superhard bearing surfaces 112.

In an embodiment, the lubricant body 120 may be urged or biased toward the opposing bearing surface during operation of the thrust-bearing assembly 100. For example, under some operating conditions, a temperature of the superhard table 111 may increase causing the superhard table 111 to expand (e.g., the superhard bearing surface 112 may move away from the support ring 130). As mentioned above, the lubricant body 120 may be attached to or contact the superhard table 111. In such an embodiment, as the superhard table 111 expands and the superhard bearing surface 112 moves away from the support ring 130, the lubrication surface 121 may also move away from the support ring 130 (e.g., together with the superhard bearing surface 112).

In one or more embodiments, the lubrication surface 121 of the lubricant body 120 may be substantially coplanar with the superhard bearing surface 112 of the superhard table 111. Moreover, as the superhard bearing surface 112 moves away from the support ring 130 (e.g., as the superhard table 111 expands during operation of the thrust-bearing assembly 100), the lubrication surface 121 may also move away from the support ring 130 such that the lubrication surface 121 and the superhard bearing surface 112 remain substantially coplanar. Also, in such an embodiment, as the bearing surface 112 of the superhard table 111 moves toward the support ring 130, the lubrication surface may also move toward the support ring 130. The lubricant body 120 may include substantially incompressible or solid lubricant. In an embodiment, however, the lubricant body 120 may be at least partially compressible. For example, expansion of the superhard table 111 may expand at least a portion of the lubricant body 120 (e.g., a bottom surface of the lubricant body 120 may remain in contact with the support ring 130, while the lubrication surface 121 of the lubricant body 120 may move away from the support ring 130, such that the lubrication surface 121 is coplanar with or above the superhard bearing surface 112).

In an embodiment, the lubricant body 120 may protrude away from the support ring 130 farther than the superhard table 111, such that the lubrication surface 121 is farther from the support ring 130 than the superhard bearing surface 112 (e.g., when the lubricant body 120 is in an uncompressed state). For example, at least a portion of the lubricant body 120 may be compressed during operation, such that the lubrication surface 121 and the superhard bearing surface 112 may be approximately coplanar (e.g., the opposing bearing surface may compress the lubricant body 120 during operation. In an embodiment, the lubricant body 120 may carry at least some of the load (e.g., thrust load) experienced by the thrust-bearing assembly 100. In an embodiment, compressing the lubricant body 120 during operation of the thrust-bearing assembly 100 may increase the load-carrying capacity of the lubricant body 120 and of the thrust-bearing assembly 100.

The lubricant body 120 may have a predetermined compression ratio, which may be related to the amount of force required to compress an area of the lubricant body 120 by a linear measure of thickness (e.g., the amount of force to compress 1 square millimeter of lubricant body 120 by 1 millimeter in thickness). Moreover, as mentioned above, the lubricant body 120 may expand during operation of the thrust-bearing assembly 100 (e.g., due to thermal expansion of the lubricant body 120), such that the unconfined thickness of the lubricant body 120 increases. In some embodiments, the expanded lubricant body 120 may have a higher compression ratio than the unexpanded lubricant body 120, and may require higher amount of force for compressing the expanded lubricant body 120 (e.g., by 1 millimeter) than unexpanded lubricant body 120.

In some embodiments, the superhard table 111 may protrude out of or above the lubrication surface 121 of an unexpanded lubricant body 120 (e.g., the superhard bearing surface 112 may be farther from the support ring 130 than the lubrication surface 121). Under some operating conditions, as mentioned above, the lubricant body 120 may expand in response to heating thereof, in response to heating and expansion of the superhard table 111, and/or by mechanical mechanisms, such as a biasing element. For example, after expansion of the lubricant body 120, the lubrication surface 121 may be coplanar with the superhard bearing surface 112 or may protrude past the superhard bearing surface 112 (e.g., the lubricant body 120 may have a higher coefficient of thermal expansion than the superhard table 111).

As mentioned above, in an embodiment, the lubrication surface 121 and the superhard bearing surfaces 112 may collectively form a substantially monolithic or continuous surface. Alternatively, the thrust-bearing assembly 100 may include a step between the lubrication surface 121 and the superhard bearing surfaces 112. Also, as mentioned above, under some operating conditions the thrust-bearing assembly 100 may include a step between the lubrication surface 121 and one, some, or all of the superhard bearing surfaces 112 (e.g., while the thrust-bearing assembly 100 is stationary relative to the opposing bearing surface). Under some operating conditions, the lubrication surface 121 and the superhard bearing surface 112 may be approximately coplanar (e.g., after the thrust-bearing assembly 100 and the opposing bearing surface or bearing apparatus rotate relative to each other, thereby heating and expanding the lubricant body 120). In an embodiment, the lubrication surface 121 may surround or encompass one, some, or all of the superhard bearing surfaces 112.

In some embodiments, the lubricant body 120 may be movable relative to the superhard bearing elements 110 (e.g., approximately parallel to rotation axis 10). For example, the bearing assembly 100 may include at least one biasing element 140 that may urge or force the lubricant body 120 away from the support ring 130. In other words, the lubricant body 120 may move relative to the superhard bearing elements 110 in a direction that is approximately parallel to the rotation axis 10.

As described below in more detail, the biasing element 140 may be any suitable element or component that may urge or force the lubricant body 120 away from the support ring 130 and toward an opposing bearing surface (e.g., the biasing element 140 may urge or force the lubrication surface 121 toward and/or against the bearing surface of an opposing bearing assembly). For example, the biasing element 140 may include a material that has a higher thermal expansion coefficient than the superhard bearing elements 110 and/or portions thereof, the support ring 130, or combinations of the foregoing. Furthermore, in some embodiments, the biasing element 140 may be substantially uniform and/or unitary or monolithic.

In an embodiment, the lubricant body 120 may include a sharp edge between the lubrication surface 121 and an inner peripheral surface of the lubricant body 120. Similarly, the lubricant body 120 may include a sharp edge between the lubrication surface 121 and an outer peripheral surface of the lubricant body 120. In some embodiments, as shown in FIG. 1B, the thrust-bearing assembly 100a may include a lubricant body 120a that may include a chamfer 122a. Except as otherwise described herein, the thrust-bearing assembly thrust-bearing assembly 100a and its materials, elements, components, or features may be similar to or the same as the bearing assembly thrust-bearing assembly 100 (FIG. 1A) and its corresponding materials, elements, components, and features. For example, the lubricant body 120a may be similar to the lubricant body 120 (e.g., with the exception of the chamfer 122a, which may be formed between a lubrication surface 121a and an outer peripherals surface of the lubricant body 120a).

Figure 1C:
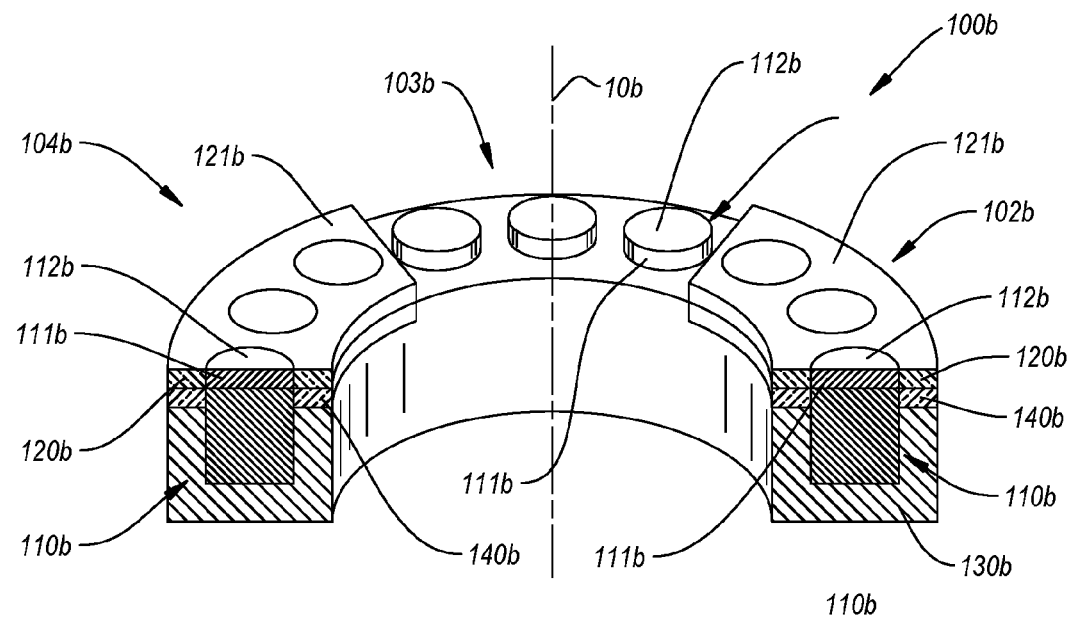
FIG. 1C is an isometric cutaway view of a thrust-bearing bearing assembly according to yet another embodiment.

Similar to the thrust-bearing assembly 100 (FIG. 1A), the thrust-bearing assembly 100a may include a biasing element 140a that may urge or force the lubricant body 120a and/or lubricant surface 121a toward and/or against a bearing surface of the opposing bearing assembly. In some embodiments, the biasing element 140a may be compressible, such that during operation of the bearing assembly 100a, the biasing element 140a may be at least partially compressed and/or may press the lubricant surface 121a toward and/or against the bearing surface of the opposing bearing assembly. For example, the biasing element 140a may be a spring, such as a washer spring, which may be at least partially compressed by the opposing bearing assembly that may press against the lubricant body 120a that in turn may apply a corresponding compressive force onto the biasing element 140a. In an embodiment, in response to compression, the biasing element 140a may urge or force the lubricant body 120a and/or the lubrication surface 121a toward and/or against the bearing surface of the opposing bearing assembly. In an embodiment, each of the superhard bearing elements may be laterally surrounded by lubricant (e.g., from a lubricant body). In some embodiments, only some superhard bearing elements of a bearing assembly may be laterally surrounded by the lubricant, while other superhard bearing elements may be exposed and/or substantially free of the lubricant body. FIG. 1C illustrates a thrust-bearing assembly 100b that includes superhard bearing elements 110b (not all labeled) mounted on a support ring 210d. Except as otherwise described herein, the thrust-bearing assembly thrust-bearing assembly 100b and its materials, elements, components, or features may be similar to or the same as any of the bearing assemblies thrust-bearing assembly 100, 100a (FIGS. 1A-1B) and their corresponding materials, elements, components, and features. For example, the superhard bearing elements 110b and the support ring 130b may be similar to or the same as the superhard bearing elements 110 and the support ring 130, 130a of the thrust-bearing assembly 100 (FIGS. 1A-1B).

In an embodiment, different groups of the superhard bearing elements 110b may be at least partially or entirely laterally surrounded by respective lubricant bodies 120b. For example, the thrust-bearing assembly 100b may include lubricated regions 102b, 104b that have superhard bearing elements 110b (in those regions) completely laterally surrounded by respective lubricant bodies 120b. Additionally or alternatively, the thrust-bearing assembly 100b may include one or more regions that include superhard bearing elements 110b that are not enclosed or surrounded by a lubricant body (e.g., region 103b). For example, along the region 103b, the superhard bearing elements 110b may be at least partially exposed and not laterally surrounded by any of the lubricant bodies 120b.

In an embodiment, each of the superhard bearing elements 110b may include a superhard table 111b that may have a superhard bearing surface 112b (not all labeled). For example, within regions 102b and 104b, the superhard table 111b may be surrounded by the respective portions of the lubricant body 120b, while in region 103b, at least a portion of some of the superhard tables 111b may be exposed. In some embodiments, the regions including a lubrication body may alternate with the other regions (e.g., on the support ring 130b, regions 102b, 103b, 104b may be sequentially, circumferentially located about a rotation axis 10b of the thrust-bearing assembly 100b).

Under some operating conditions, absence of the lubricant body 120b in the region 103b of the thrust-bearing assembly 100b may facilitate gas and/or liquid flow through the thrust-bearing assembly 100b and the bearing apparatus that includes the thrust-bearing assembly 100b. For example, air and/or fluids (e.g., drilling mud) may flow about and between the superhard bearing elements 110b (e.g., about and between the superhard tables 120b) at the region 103b. Such air and/or drilling mud flow may cool and/or lubricate the thrust-bearing assembly 100b, one or more of the superhard bearing surfaces 112d, a bearing surface opposing the superhard bearing surface 112d, an opposing bearing assembly, or combinations thereof. Moreover, in some embodiments, the opposing bearing surface may contact and/or move over the lubrication surfaces 121b in the regions 102b, 104b of the thrust-bearing assembly 100b (e.g., at the regions 102b, 104b), such that the lubricant therefrom may interact with, contact, and/or adhere to an opposing bearing surface. In an embodiment, the lubricant from the regions 102b, 104b may contact one or more of the superhard bearing surfaces 112b.

Furthermore, in at least one embodiment, the lubricant tables 120b may be movable relative to the superhard bearing elements 110b (e.g., in a direction approximately parallel to the rotation axis 10b. For instance, the thrust-bearing assembly 100b may include one or more biasing elements 140b (e.g., at one or more of the regions that include the lubricant tables 120b, such as regions 102b, 104b). In some embodiments, the biasing elements 140b may be similar to the biasing elements 140 (FIG. 1A) and/or may include similar or the same materials. In any event, the biasing elements 140b may urge or force the lubrication surface 121b toward and/or against a bearing surface of an opposing bearing assembly.

Figure 1D:
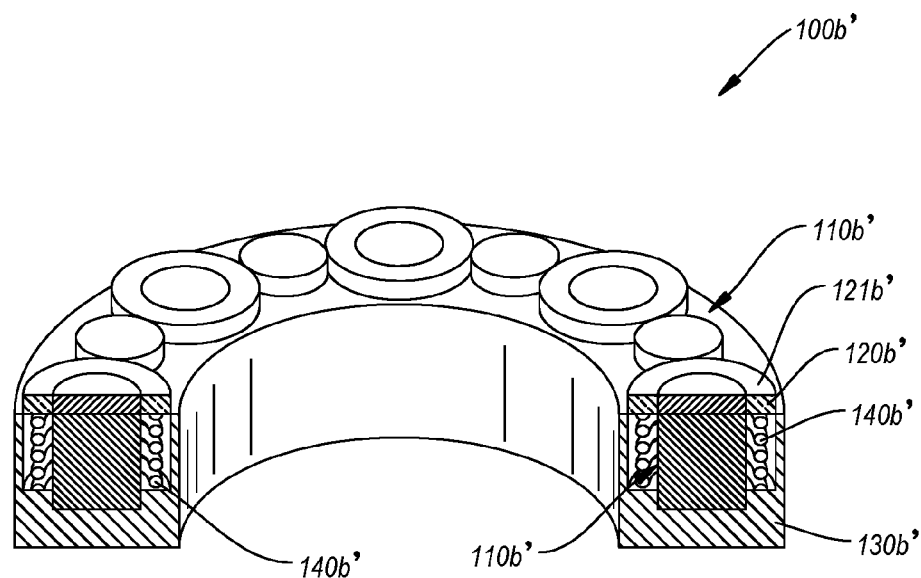
FIG. 1D is an isometric cutaway view of a thrust-bearing bearing assembly according to yet another embodiment.

As mentioned above, in some instance, the biasing elements may be compressible and/or may otherwise mechanically extend and/or apply force onto the lubricant body generally in a direction away from the support ring. Moreover, lubricant bodies may be located in discrete regions, such that each or some of the lubricant bodies surround individual superhard bearing elements. FIG. 1D illustrates a thrust-bearing assembly 100b' that includes superhard bearing elements 110b' mounted on a support ring 130b' and lubricant bodies 120b' that surround some of corresponding superhard bearing elements 110b' (not all labeled). Except as otherwise described herein, the thrust-bearing assembly 100b' and its materials, elements, components, or features may be similar to or the same as any of the bearing assemblies 100, 100a, 100b (FIGS. 1A-1C) and their corresponding materials, elements, components, or features.

For example, the superhard bearing elements 100b' may be similar to or the same as the superhard bearing elements 110b'. In an embodiment, each of the lubricant bodies 120b' may have an opening that may fit over a corresponding superhard bearing element 110b'. For instance, every other superhard bearing element 110b' may have a corresponding lubricant body 120b' fitted over a portion thereof.

Moreover, as described above, at least some of the lubricant tables 120b' may be movable relative to at least some of the superhard bearing elements 110b'. For example, the thrust-bearing assembly 100b' may include one or more biasing elements 140b' (e.g., illustrated as compression springs in FIG. 1D) that may urge or force the lubricant tables 120b' and corresponding lubrication surfaces 121b' away from the support ring 130b'. In some instances, some or each of the lubricant tables 120b' may have a discrete or individual biasing element 140b' that may urge of force such lubricant table(s) 120b' away from the support ring 130b'.

In some embodiments, the biasing element 140b' may be a spring or a similar resilient biasing element. For example, the biasing element 140b' may be compressed and may urge or force the lubrication surface 121b' toward and/or against a bearings surface of an opposing bearing assembly. Additionally or alternatively, in some examples, the thrust-bearing assembly 100b' may include a plate or a support disk that may be positioned between the biasing element and the lubricant body 120b'. In some instances, the support disk may be attached to or integrated with the lubrication body 120b'. For example, the support disk may include or comprise rigid material (e.g., steel, carbide, etc.) that provide support to the lubricant body 120b' and/or distribute force from the biasing element 140b' thereon.

Figure 2:
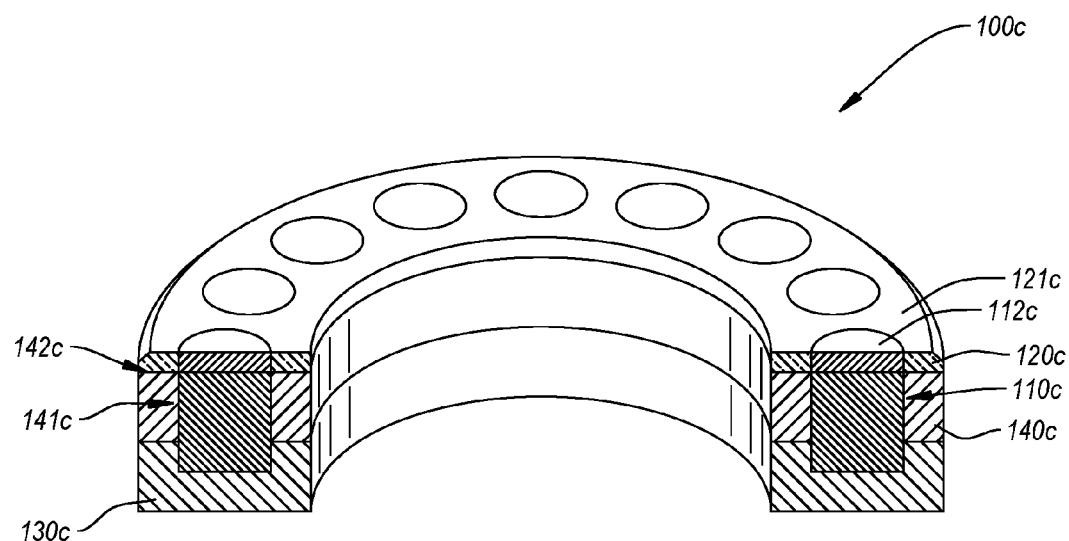
FIG. 2 is an isometric cutaway view of a thrust-bearing bearing assembly according to at least one other embodiment.

In some embodiments, the bearing assembly may include one or more biasing elements, which may advance or apply a force to the lubricant body 120c in a direction away from the support ring and/or toward an opposing bearing surface of, for example, an opposing bearing assembly. FIG. 2 illustrates a thrust-bearing assembly 100c that includes an biasing element 140c located under the lubricant body 120c. Generally, the biasing element 140c may be sized and configured to urge a lubrication surface 121c of lubricant body 120c toward and an opposing bearing surface. Except as otherwise described herein, the thrust-bearing assembly 100c and its materials, elements, components, or features may be similar to or the same as any of the bearing assemblies 100, 100a, 100b, 100b' (FIGS. 1A-1D) and their corresponding materials, elements, components, or features.

In an embodiment, the thrust-bearing assembly 100c may include superhard bearing elements 110c, which may be the same as the thrust-bearing assembly 100 (FIG. 1A). The superhard bearing elements 110c may be secured or mounted to a support ring 130c. In some embodiments, the biasing element 140c may be mounted or secured to the support ring 130c by brazing, fastening, combinations thereof, or other suitable technique. Additionally or alternatively, the biasing element 140c may be integrated with the support ring 130c. For example, the biasing element 140c may have an approximately the same shape and/or size as the support ring 130c. In an embodiment, the biasing element 140c may have an approximately the same inside diameter and/or outside diameter as the support ring 130c. In one or more embodiments, inner and/or outer perimeter (or peripheral surfaces) of the biasing element 140c may be different from the respective inner and/or outer perimeter (or peripheral surfaces) of the support ring 130c.

In some embodiments, the biasing element 140c may include openings 141c (not all labeled) that may accept the superhard bearing elements 110c. In some embodiments, the superhard bearing elements 110c may be mounted on the support ring 130c and may pass through the openings 141c in the biasing element 140c. In an embodiment, the superhard bearing elements 110c may protrude above the biasing element 140c. For example, the lubrication surface 121c may be located farther away from the support ring 130c than a top surface 142c of the biasing element 140c (e.g., the lubrication surface 121c may be above the biasing element 140c).

In an embodiment, the lubricant body 120c may be bonded or otherwise secured to the biasing element 140c. For example, the lubricant body 120c may be attached to the top surface 142c of the biasing element 140c. In some embodiments, as mentioned above, the biasing element 140c may advance the lubricant body 120c away from the support ring 130c and/or toward the opposite bearing surface. In an embodiment, the biasing element 140c may apply force to the lubricant body 120c, which may urge the lubricant body 120c away from the support ring 130c and/or toward the opposite bearing surface during operation of the thrust-bearing assembly 100c.

In some embodiments, the lubricant body 120c may be movable relative to the superhard bearing elements 110c (e.g., the lubricant body 120c may include one or more opening that may slide about the superhard bearing elements 110c as the lubricant body 120c move toward the opposite bearing surface). Moreover, as the lubrication surface 121c wears, movement of the lubricant body 120c toward the opposite bearing surface may maintain the lubrication surface 121c in contact with the opposite bearing surface. For example, the lubricant body 120c may generally continuously provide lubricant to at least a portion of an opposing bearing surface and/or to at least a portion of at least one superhard bearing surface 112c (e.g., the opposite bearing surface may cause the lubricant to contact at least a portion of one or more of the superhard bearing surfaces 112c.

In some embodiments, the biasing element 140c may apply a force to the lubricant body 120c in response to a temperature change of the thrust-bearing assembly 100c or a portion thereof (e.g., temperature change of the biasing element 140c). For example, the biasing element 140c may force the lubricant body 120c toward the opposite bearing surface in response to temperature increase of the biasing element 140c. Under some operational conditions, temperature of the biasing element 140c may increase due to the heat generated from friction between the lubrication surface 121c and superhard bearing surfaces 112c on one side and the opposing bearing surfaces on the opposite side that may move or rotate relative to the thrust-bearing assembly 100c. In some embodiments, at least some of the heat may be transferred from the lubrication surfaces 121c and/or superhard bearing surfaces 112c to the biasing element 140c, thereby increasing the temperature thereof.

In an embodiment, the biasing element 140c may include material(s) with a higher coefficient of thermal expansion that the support ring 130c and/or superhard bearing elements 110c (and its components). The biasing element 140c may expand in response to increase in temperature at a higher rate than the support ring 130c and/or the superhard bearing elements 110c. For example, as the biasing element 140c expands, the top surface 142c may move away from the support ring 130c and toward the opposing bearing surface. In some embodiments, the biasing element 140c may include copper, aluminum, aluminum alloys, copper alloy, brass, bronze, expanding foam (e.g., expanding plastic foam), any other suitable material, or combinations thereof, while the support ring 130c may be manufactured from steel (e.g., alloy, tool steel, etc.), stainless steel, cemented carbide (e.g., cobalt-cemented tungsten carbide), or combinations thereof. Additionally or alternatively, the biasing element 140c may be a spring (e.g., a washer spring), a gas actuator, hydraulic actuator, gas actuator, paraffin wax actuator, electric actuator, compressible material, etc.

In some embodiments, the biasing element 140c may include one or more resilient elements (e.g., springs), which may force the lubricant body 120c away from the support ring 130c and toward the opposing bearing surface. As mentioned above, the biasing element 140c may be movable relative to the superhard bearing elements 110c. In some embodiments, the biasing element 140c may press the lubricant body 120c against an opposing bearing surface during operation of the thrust-bearing assembly 100c. As the lubricant is removed from the lubricant body 120c and the lubrication surfaces 121c wears, the biasing element 140c may continue to press the lubrication surfaces 121c against the opposing bearing surface, such that the lubricant body 120c may continue to supply lubricant to at least one opposing bearing surface.

Figure 3:
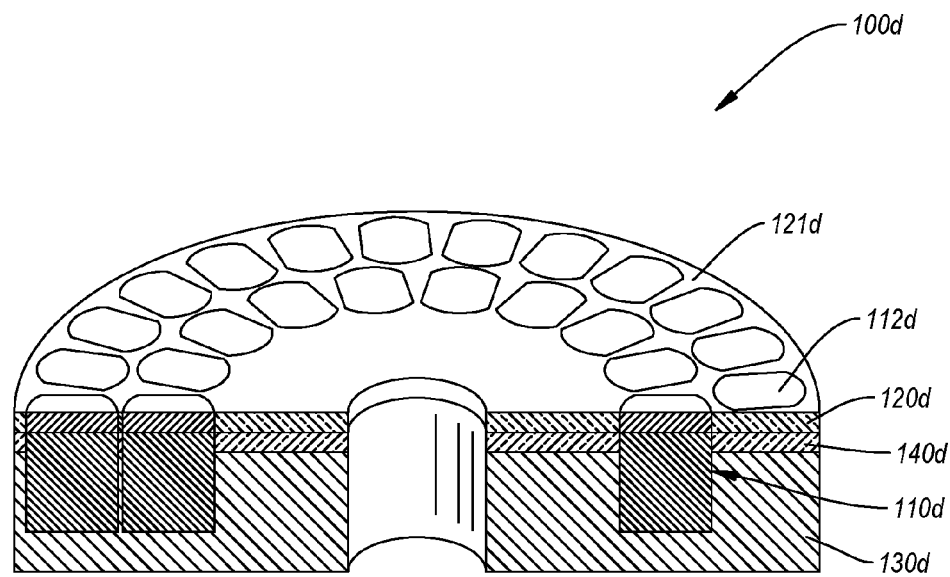
FIG. 3 is an isometric cutaway view of a thrust-bearing bearing assembly according to still another embodiment.

As described above, the superhard bearing elements may be arranged in any suitable manner on the support ring (e.g., a single row, multiple rows, etc.), which may vary from one embodiment to the next. As shown in FIG. 3, in some embodiments, a thrust-bearing assembly 100d includes multiple rows of superhard bearing elements 110d (not all labeled) that may be secured to a support ring 130d. Except as otherwise described herein, the thrust-bearing assembly 100d and its materials, elements, components, or features may be similar to or the same as any of the bearing assemblies 100, 100a, 100b, 100b', 100c (FIGS. 1A-2) and their corresponding materials, elements, components, and features.

For example, the thrust-bearing assembly 100d includes two rows of the superhard bearing elements 110d secured to the support ring 130d. It should be appreciated, however, that a bearing assembly may include any suitable number of rows of superhard bearing elements. In some embodiments, the thrust-bearing assembly 100d may include a lubricant body 120d that may be movable relative to the support ring 130d and/or relative to the superhard bearing elements 110d, such that lubrication surface 121d of the lubricant body 120d presses against an opposite bearing surface and supplies lubricant to at least one opposite bearing surface.

Furthermore, the thrust-bearing assembly 100d may include at least one biasing element 140d that may urge or force the lubricant body 120d away from the support ring 130d. For example, the lubricant body 120d may be movable relative to the support ring 130d and/or relative to the superhard bearing elements 110d. The biasing element 140d may be positioned between the lubricant body 120d and the support ring 130d. As such, in some embodiments, the biasing element 140d may apply a force to the lubricant body 120d in a manner that moves that lubricant body 120d away from the support ring 130d.

Figure 4A:
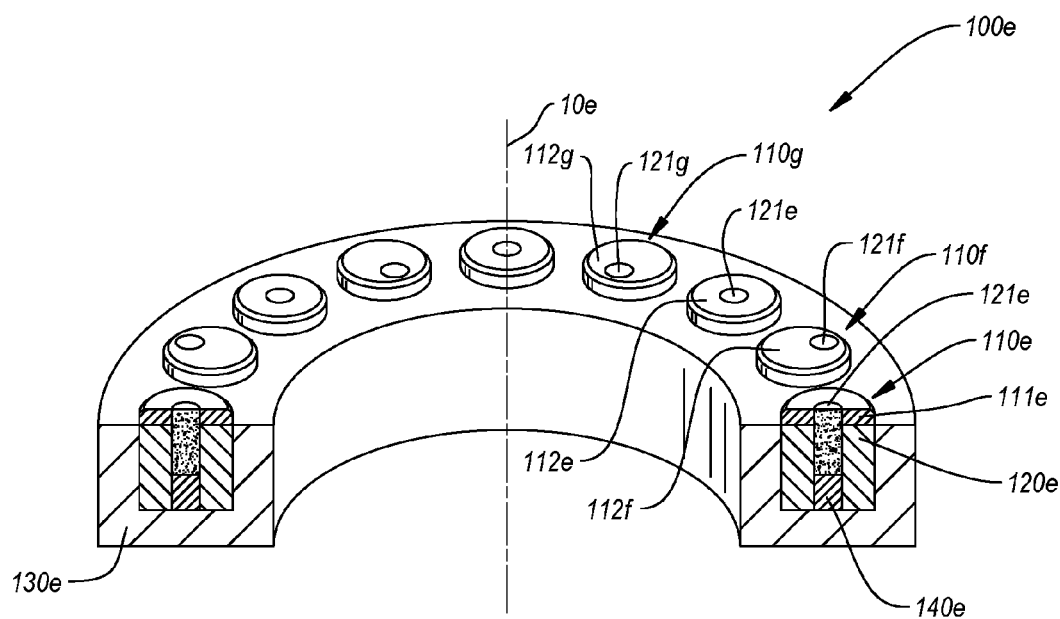
FIG. 4A is an isometric cutaway view of a thrust-bearing bearing assembly according to an embodiment.

In some embodiments, a lubricant body and/or biasing elements may be located inside one or more superhard bearing elements. FIG. 4A illustrates a thrust-bearing assembly 100e that includes a plurality of a superhard bearing elements 110e, 110f, 110g (not all labeled) that have lubricant bodies therein, according to an embodiment. Except as otherwise described herein, the thrust-bearing assembly 100e and its materials, elements, components, or features may be similar to or the same as any of the bearing assemblies 100, 100a, 100b, 100b', 100c, 100d (FIGS. 1A-3) and their corresponding materials, elements, components, and features. For example, the superhard bearing elements 110e, 110f, 110g may be secured to a support ring 130e, which may be similar to or the same as the support ring 130 of the thrust-bearing assembly 100 (FIG. 1A).

In an embodiment, the superhard bearing elements 110e, 110f, 110g may include corresponding lubrication surfaces 121e, 121f, 121g (not all labeled) formed by lubricant bodies located inside the superhard bearing elements 110e, 110g, 110f, respectively. For example, each of the superhard bearing elements 110e may include a lubricant body 120e that may define the lubrication surfaces 121e. In an embodiment, the superhard bearing elements 110e may include an opening that may accommodate and/or secure the lubricant body 120e therein.

According to one or more embodiments, the lubricant body 120e may be loosely fitted or may be press-fit within the opening in the superhard bearing element 110e, such that the lubricant body 120e may move (under certain conditions) within the opening relative to the superhard bearing elements 110e. Similarly, lubricant bodies within superhard bearing elements 110f, 110g may be loosely fitted or may be press-fit within corresponding openings in the superhard bearing elements 110f, 110g. Moreover, it should be appreciated that references to the superhard bearing elements 110e, lubricant body 120, and lubrication surfaces 121e are made in the interest of conciseness, and superhard bearing elements 110f, 110g and corresponding lubricant bodies may have the same or similar configurations.

In some embodiments, as described above, the lubricant body 120 may be forced toward the opposing bearing surface. For example, the lubricant body 120e may slide or be movable relative to the superhard bearing elements 110e. In some embodiments, the lubricant body 120e may be urged by a biasing element 140e, which may be located under the lubricant body 120e in the superhard bearing element 110e. According to an embodiment, the biasing element 140e may include thermally-expanding material (e.g., having a higher coefficient of thermal expansion than a coefficient of thermal expansion of the superhard bearing elements 110e), a spring, combinations of the foregoing, etc. For example, the biasing element 140e may comprise copper, a copper alloy, aluminum, an aluminum alloy, brass, bronze, foam, combinations thereof, or other type of thermally-expanding material.

In some embodiments, the lubrication surfaces 121e, 121f, 121g may be smaller than superhard bearing surfaces 112e, 112f, 112g. In an embodiment, each of the lubrication surfaces 121e may be at least partially or completely laterally surrounded by corresponding superhard bearing surface 112e. The lubrication surfaces 121e, 121f, 121g may be arranged such that lubricant may be distributed to multiple locations or regions on one or more opposing bearing surfaces. In an embodiment, a center of the lubrication surface 121e may be aligned with a center of the superhard bearing surface 112e (e.g., concentrically aligned), and centers of the lubrication surface 121f, 121g may be offset (e.g., radially or laterally) from respective centers of the superhard bearing surfaces 112f, 112g.

Moreover, the superhard bearing elements 110e, 110f, 110g may be arranged sequentially on the support ring 130e (e.g., about a rotation axis 10e of the thrust-bearing assembly 100e). For example, the lubrication surfaces 121e, 121f, 121g of the respective adjacently positioned superhard bearing elements 110e, 100f, 100g may be offset (e.g., radially and/or laterally) relative to one another. In an embodiment, as an opposing bearing surface on one side and the superhard bearing surfaces 112e, 112f, 112g on another side rotate relative to and/or in contact with each other, the lubrication surfaces 121e, 121f, 121g may lubricate different radial portions of opposing/adjacent bearing surface(s).

Figure 4B:
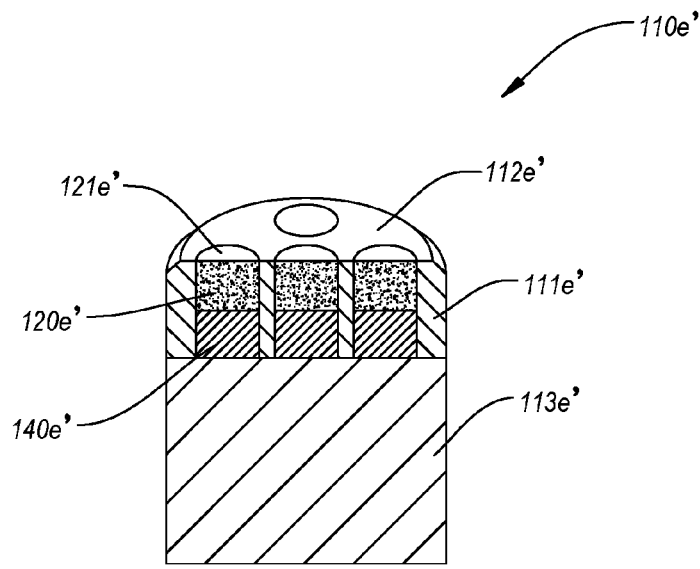
FIG. 4B is an isometric cutaway view of a superhard bearing element for use with any of the thrust-bearing assemblies disclosed herein, according to an embodiment.

In some embodiments, the lubricant body and the biasing mechanism may be located within the superhard table. FIG. 4B illustrates a superhard bearing element 110e' according to one or more embodiments. The superhard bearing element 110e' may be included in any of the bearing assemblies described herein. In some embodiments, the superhard bearing element 110e' may include a superhard table 111e' bonded to a substrate 113e'. Furthermore, the superhard table 111e' may include a superhard bearing surface 112e' (e.g., the superhard bearing surface 112e' may be substantially planar; as described below, in some embodiments, the superhard bearing surface and/or lubrication surface may have a non-planar configuration, such as concave or convex).

In an embodiment, the superhard bearing element 110e' may include lubricant bodies 120e' (not all labeled) located within one or more openings in the superhard table 111e'. For example, as mentioned above, the lubricant bodies 120e' may include graphite (as a single piece, multiple piece, powder, or combinations thereof). Moreover, the lubricant body 120e' may be advanced away from the substrate 113e' and out of the openings in the superhard table 111e'. In some embodiments, the lubricant body 120e' may include or form lubrication surfaces 121e' (not all labeled). In an embodiment, the lubrication surfaces 121e' may be laterally surrounded by the superhard bearing surface 112e'.

In an embodiment, the lubrication surfaces 121e' may be approximately coplanar with the superhard bearing surface 112e'. As the lubricant is removed from the lubricant bodies 120e' to lubricate at least a portion of superhard bearing surface 112e' and/or to lubricate at least a portion of an opposing bearing surface, the lubricant bodies 120e' may advance or move away from the substrate 113e'. For example, the lubricant bodies 120e' may advance or move away from the substrate 113e' such that at least some portions of the lubrication surfaces 121e' remain substantially coplanar with the superhard bearing surface 112e.

In some embodiments, the superhard bearing element 110e' may include one or more biasing elements 140e' (not all labeled), which may force or urge corresponding lubricant bodies 120e' away from the substrate 113e' and out of the openings in the superhard table 111e'. For example, a portion of at least some of the biasing elements 140e' may be secured to the substrate 113e' and/or to the superhard table 111e'. In an embodiment, another portion of at least some of the biasing elements 140e' (e.g., upper portion, which is in contact with the lubricant body 120e') may be movable relative to the superhard table 111e' and/or relative to the substrate 113e'. Similarly, in an embodiment, the lubricant bodies 120e' may be movable with the openings in the superhard table 111e', such that the biasing elements 140e' may cause corresponding lubricant bodies 120e' to move out of the openings.

As described above, in some the lubricant bodies 120e' may advance or move away from the substrate 113e', the biasing elements 140e' may have a higher coefficient of thermal expansion than the substrate 113e' and/or superhard table 111e'. Under some operating conditions, as the temperature of the superhard table 111e' increases, heat from the superhard table 111e' may be transferred to at least some of the biasing elements 140e', thereby increasing temperature thereof and expanding the heated biasing elements 140e'. As mentioned above, the biasing elements 140e' may have a higher coefficient of thermal expansion than the superhard table 111e'. For example, higher thermal expansion of the biasing elements 140e' may result in movement of a top portion of the biasing element 140e' relative to the superhard table 111e', thereby urging or forcing the lubricant bodies 120e' out of the holes in the superhard table 111e' and toward and/or against one or more opposing bearing surfaces.

As shown in FIG. 4B, the superhard table 111e' of the superhard bearing element 110e' may include multiple openings that may accommodate corresponding lubricant bodies 120e' and/or the biasing elements 140e' therein. Particular sizes and/or shapes of the openings may vary from one embodiment to the next. Likewise, the number of opening may vary from one embodiment to another. Also, it should be appreciated that the openings and the lubrication surfaces 121e' may be located at any number of suitable locations and may be arranged in any number of suitable patterns or arrangements. For example, the number of openings may depend on desired or suitable surface area of the superhard bearing surface 112e' and/or of the lubrication surfaces 121e' for a particular application and/or load on a bearing assembly.

Figure 5A:
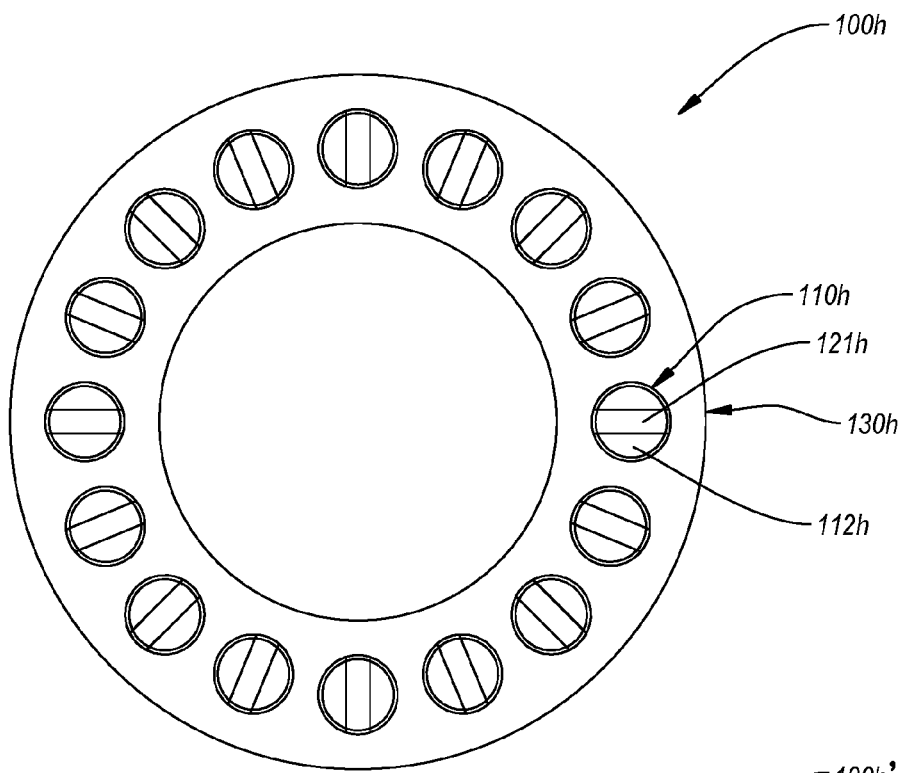
FIG. 5A is a top plan view of a thrust-bearing bearing assembly according to an embodiment.
Figure 5B:
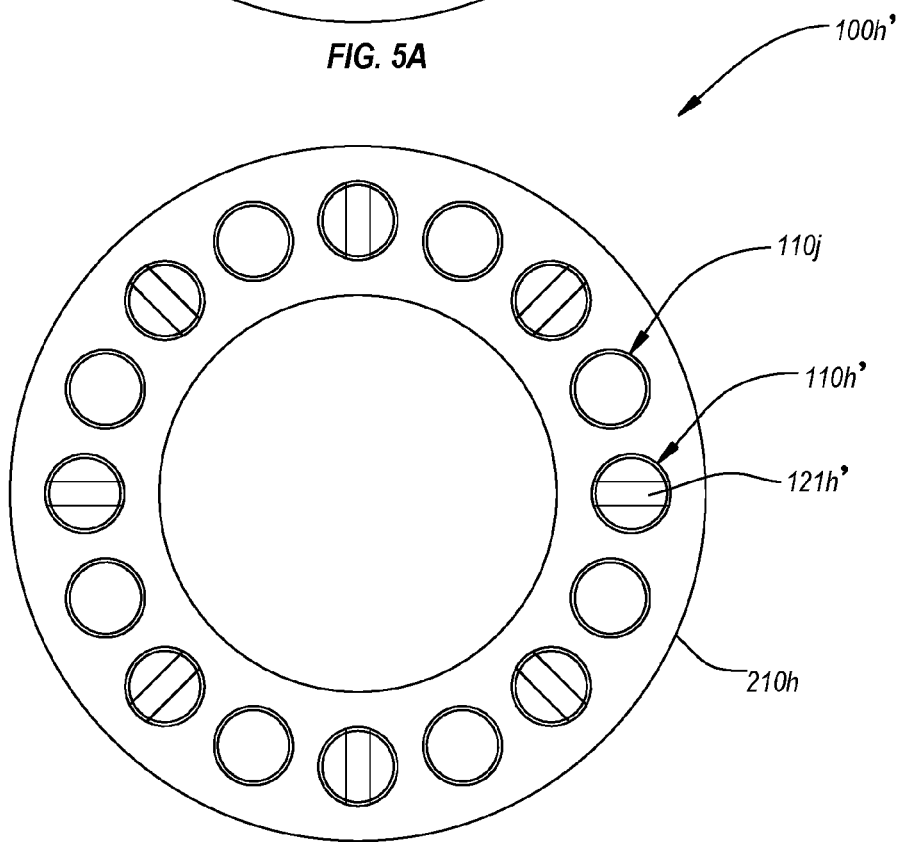
FIG. 5B is a top plan view of a thrust-bearing bearing assembly according to another embodiment.

Generally, the lubrication surfaces and/or openings in the superhard bearing elements for lubricant body(s) may vary from one embodiment to the next. FIGS. 5A-5B illustrates thrust-bearing assemblies 100h and 100h' that include respective superhard bearing elements 110h, 110h' with approximately rectangular lubrication surfaces, according to one or more embodiments. Except as otherwise described herein, the thrust-bearing assemblies 100h, 100h' and their materials, elements, components, or features may be similar to or the same as any of the bearing assemblies 100, 100a, 100b, 100b', 100c, 100d, 100e (FIGS. 1A-4) and their corresponding materials, elements, components, and features. As shown in FIG. 5A, in an embodiment, the thrust-bearing assembly 100h may include a support ring 130h and a plurality of superhard bearing elements 110h secured thereto; the superhard bearing elements 110h may include superhard bearing surfaces 112h (not all elements labeled).

In an embodiment, each of the superhard bearing elements 110h includes a lubricant and a lubrication surface 121h (not all labeled) formed thereby. In an embodiment, the thrust-thrust-bearing assembly 100h includes the superhard bearing elements 110h that have a slot that secures the lubricant. For example, as mentioned above, the lubricant may be movable within the slot or a rectangular opening in the superhard bearing elements 110h, such that the lubrication surfaces 121h may be pressed against an opposing bearing surface.

FIG. 5B illustrates a thrust-bearing assembly 100h' that has one or more superhard bearing elements 110j, each of which does not include a lubrication body, and superhard bearing elements 110h', each of which includes a lubrication surface 121h' (not all labeled). In some embodiments, the superhard bearing elements 110*j* and the superhard bearing elements 110*h*' may be alternatingly positioned circumferentially about a support ring 210*h* (e.g., each superhard bearing element 110*j* may be followed by and may be circumferentially adjacent to superhard bearing elements 110*h*'). Alternatively, the superhard bearing elements 110*j* and/or the superhard bearing elements 110*h*' may be grouped together, such that several of the superhard bearing elements 110*j* are positioned circumferentially next to one another and/or several superhard bearing elements 110*h*' are positioned circumferentially next to one another. Moreover, it should be appreciated that a particular arrangement and alternating or non-alternating combinations of the superhard bearing elements 110*j* and 110*h*' may vary from one embodiment to the next.

Figure 6A:
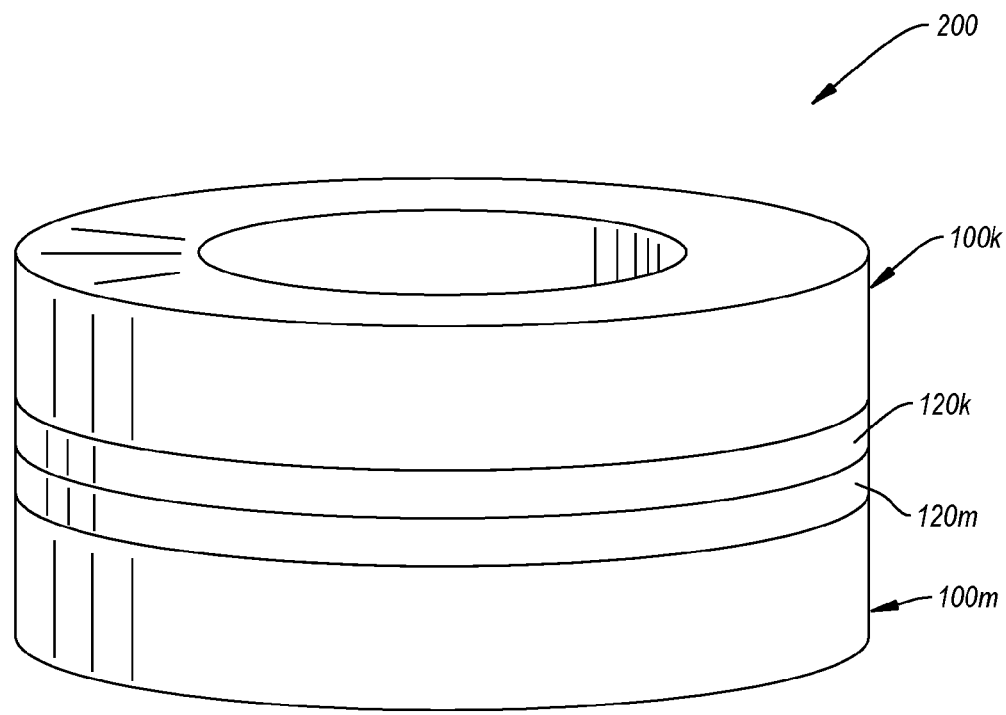
FIG. 6A is an isometric view of a thrust-bearing apparatus according to an embodiment.

Generally, one or more superhard bearing surfaces and/or lubrication surfaces of a thrust-bearing assembly may engage and/or may rotate or contact at least a portion of an opposing bearing surface. In some embodiments, the opposing bearing surface is included in a thrust-bearing assembly, which may be similar to or the same as any of the thrust-bearing assemblies described herein; opposing bearing assemblies may form a bearing apparatus. FIG. 6A illustrates a thrust-bearing apparatus 200 according to an embodiment. Except as otherwise described herein, the thrust-bearing assemblies 100*k*, 100*m* and their materials, elements, components, or features may be similar to or the same as any of the bearing assemblies 100, 100*a*, 100*b*, 100*b*', 100*c*, 100*d*, 100*e*, 100*h*, 100*h*' (FIGS. 1A-5B) and their corresponding materials, elements, components, and features.

For example, the thrust-bearing apparatus 200 may include thrust-bearing assemblies 100*k* and 100*m* engaged with each other. The superhard bearing surfaces of the thrust-bearing assembly 100*k* (not shown) may be engaged with and/or in contact with the superhard bearing surfaces of the thrust-bearing assembly 100*m* as the thrust-bearing assembly 100*k* and thrust-bearing assembly 100*m* rotate relative to each other. Generally, the thrust-bearing assembly 100*k* may be a stator, while the thrust-bearing assembly 100*m* may be a rotor, or vice versa. Moreover, both the thrust-bearing assembly 100*k* and thrust-bearing assembly 100*m* may rotate with one or more machine components, while having relative movement or rotation (e.g., the thrust bearing assemblies 100*m*, 100*k* may rotate at different speeds, thereby producing relative rotation therebetween).

In an embodiment, the thrust-bearing assembly 100*k* and thrust-bearing assembly 100*m* may include respective lubricant bodies 120*k* and 120*m*. For example, as the thrust-bearing assembly 100*m* and thrust-bearing assembly 100*k* rotate relative to each other, lubricant from the lubricant bodies 120*k* and/or 120*m* may be removed onto at least a portion of one or more of the bearing surfaces of superhard bearing elements (not shown) of respective thrust-bearing assemblies 100*m* and 100*k*. It should be also appreciated that the thrust-bearing assembly 100*k* and/or 100*m* may include one or more superhard bearing surfaces (e.g., the thrust-bearing assembly 100*k* may include one or more superhard bearing surfaces, while the thrust-bearing assembly 100*m* may include one or more non-superhard bearing surfaces).

As described above, one or more of the lubricant bodies 120*k*, 120*m* may be moveable. For example, during operation of the thrust-bearing apparatus 200, the lubricant body 120*k* may be moveable toward the bearing surfaces of the thrust-bearing assembly 100*m* (e.g., the lubricant body 120*k* may be advanced by and/or forced toward one or more biasing elements). Similarly, in an embodiment, the lubricant body 120*m* may be moveable toward the bearing surfaces of the thrust-bearing assembly 100*k*.

Moreover, as described above, in some embodiments, the lubricant body may laterally surround one or more superhard bearing surfaces. Alternatively or additionally, in some embodiments, the lubricant body may be located at least partially inside one or more superhard bearing elements of the thrust-bearing assembly 100*k* and/or 100*m* and may form lubrication surfaces at least partially surrounded by the corresponding superhard bearing surfaces of the superhard bearing elements. Also, in an embodiment, the lubricant bodies located at least partially inside the superhard bearing elements of the thrust-bearing assembly 100*k* may be movable toward the bearing surfaces of the thrust-bearing assembly 100*m*. In an embodiment, the lubricant bodies located at least partially inside the superhard bearing elements of the thrust-bearing assembly 100*m* may be moveable toward the bearing surfaces of the thrust-bearing assembly 100*k*.

Figure 6B:
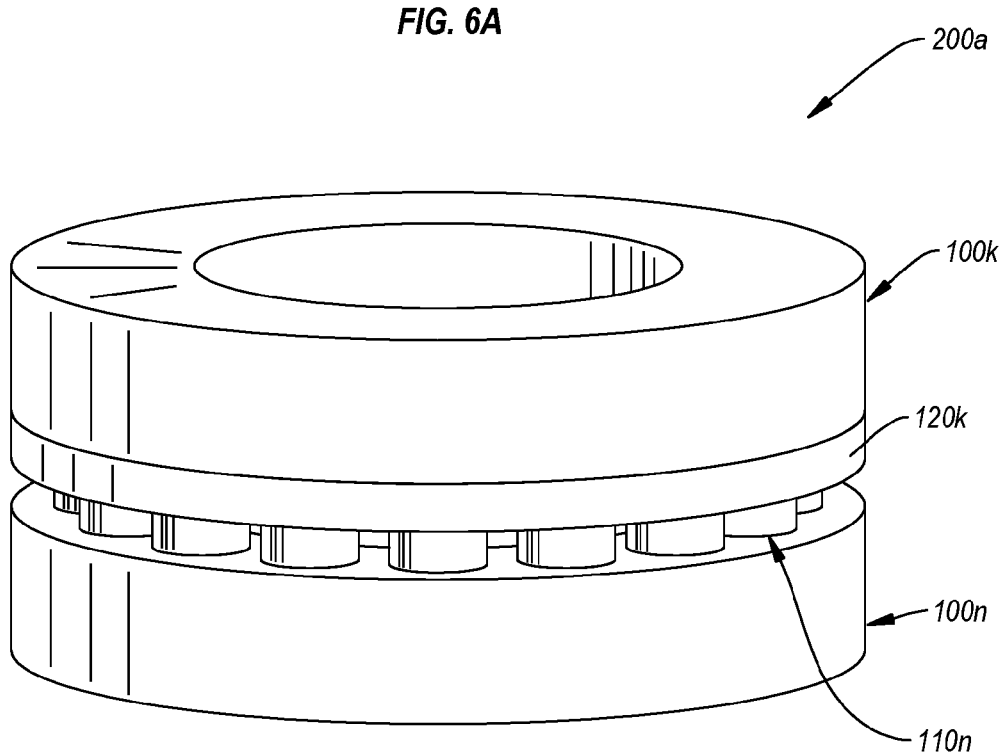
FIG. 6B is an isometric view of a thrust-bearing apparatus according to another embodiment.

Furthermore, in some embodiments, only one thrust-bearing assembly of a thrust-bearing apparatus may include one or more lubricant bodies. FIG. 6B illustrates a thrust-bearing apparatus 200*a* that includes thrust-bearing assembly 100*k* and a thrust-bearing assembly 100*n*. As mentioned above, the thrust-bearing assembly 100*k* may include lubricant body 120*k*. For example, the lubricant body 120*k* may provide lubricant to at least a portion of one or more superhard bearing elements 110*n* of the thrust-bearing assembly 100*n* during operation of the thrust-bearing apparatus 200*a*. In some embodiments, the lubricant form the lubricant body 120*k* may be transferred onto at least a portion of one or more superhard bearing surfaces of the superhard bearing elements 110*n* of the thrust-bearing assembly 100*n*. Additionally or alternatively, the lubricant may be further transferred from at least one of the superhard bearing surfaces of the superhard bearing elements 110*n* onto at least one of the superhard bearing surfaces of the thrust-bearing assembly 100*k*.

Figure 7A:
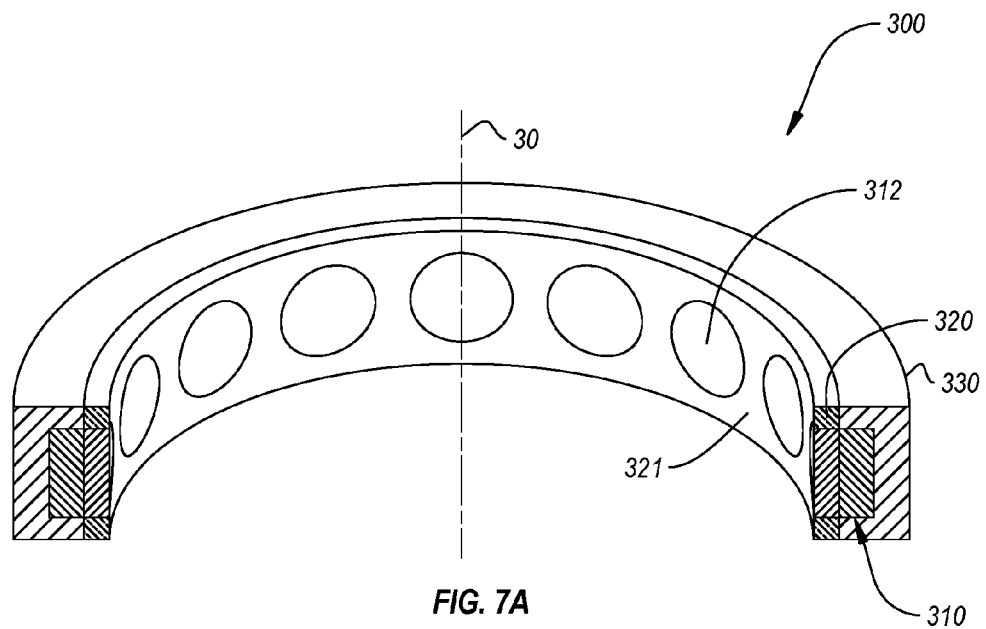
FIG. 7A is an isometric cutaway view of a radial bearing assembly according to an embodiment.

In one or more embodiments, one or more radial bearing assemblies may include one or lubrication bodies and/or one or more biasing elements which may be similar to or the same as the lubrication described above in connection with thrust-bearing assemblies. FIG. 7A illustrates a first radial bearing assembly 300 according to an embodiment. Except as otherwise described herein, the first radial bearing assembly 300 and its materials, elements, components, or features may be similar to or the same as any of the thrust-bearing assemblies 100, 100*a*, 100*b*, 100*b*', 100*c*, 100*d*, 100*e*, 100*h*, 100*h*' (FIGS. 1A-5B) and their corresponding materials, elements, components, and features.

For example, the first radial bearing assembly 300 may include superhard bearing elements 310 mounted to a support ring 330 and lubricant body 320, which may at least partially surround one or more of the superhard bearing elements 310. In some embodiments, the superhard bearing elements 310 may be similar to superhard bearing elements 110 (FIG. 1A). Furthermore, in an embodiment, concave superhard bearing surfaces 312 (e.g., the superhard bearing surfaces 312 may lie along a cylindrical imaginary surface which may be centered about rotation axis 30).

Similarly, the lubricant body 320 may include one or more lubrication surfaces 321, which may be concave and/or which may lie along a cylindrical imaginary surface. As described above, the lubrication surface 321 of the lubricant body 320 may provide lubricant onto at least a portion of at least one opposing bearing surfaces. For example, the lubricant body 320 and/or lubrication surface 321 may be urged and/or forced toward the rotation axis 30 of the first radial bearing assembly 300 and/or toward the opposing bearing surface of another radial bearing assembly. In some embodiments, the lubricant body 320 may include openings through which the superhard bearing elements 310 extend, such that the lubricant body 320 may be moveable relative to the superhard bearing elements 310 (e.g., to advance or urge the lubricant body 320 toward the opposing bearing surface).

In an embodiment, the lubrication surface 321 may lie along an approximately the same invisible cylindrical surface as the superhard bearing surfaces 312. In some embodiments, the lubricant body 320 may be flexible and/or compressible, such that the lubricant body 320 may be compressed away from or toward the rotation axis 30. In some embodiments, the lubricant body 320 may be compressed about the rotation axis 30, such that the lubrication surface 321 may move closer to the rotation axis 30 and/or may be pressed against at least a portion of an opposing bearing surface.

Figure 7B:
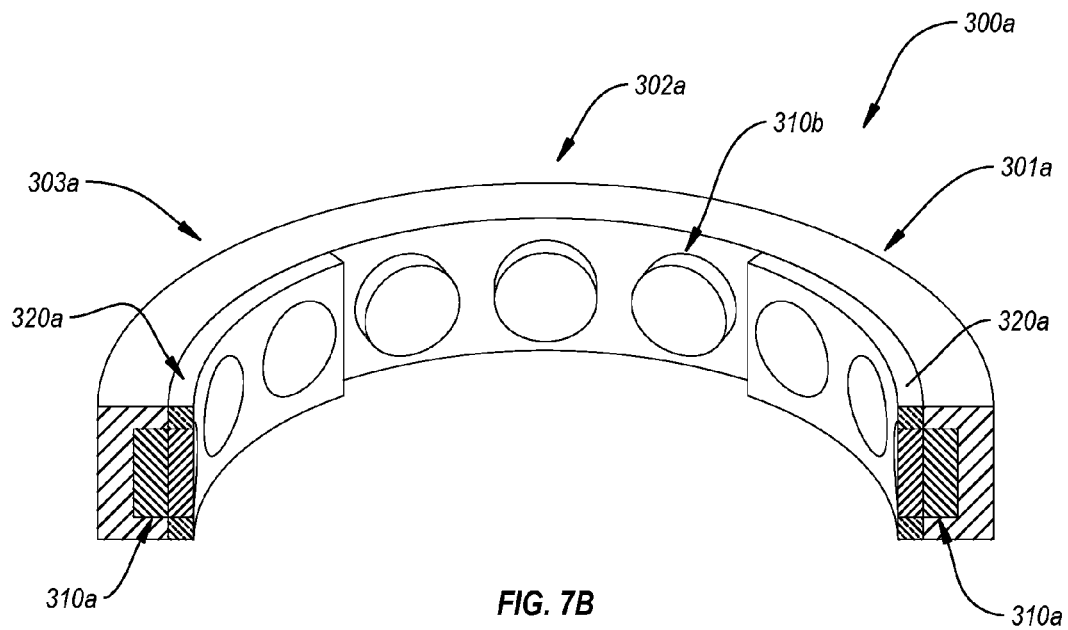
FIG. 7B is an isometric cutaway view of a radial bearing assembly according to another embodiment.

In some embodiments, the lubricant body 320 may surround all of the superhard elements 310b of the first radial bearing assembly 300. Alternatively, as shown in FIG. 7B, a first radial bearing assembly 300a may include superhard bearing elements 310b (not all labeled) free of or unenclosed by lubricant body 320a and superhard bearing elements 310a (not all labeled) that are laterally enclosed by lubricant body 320a. Except as otherwise described herein, the first radial bearing assembly 300a and its materials, elements, components, or features may be similar to or the same as any of the thrust-bearing assemblies 100, 100a, 100b, 100b', 100c, 100d, 100e, 100h, 100h' (FIGS. 1A-5B) and/or the first radial bearing assembly 300 (FIG. 7A) and their corresponding materials, elements, components, and features. For example, the first radial bearing assembly 300a may include one or more regions 301a, 303a including at least one lubricant body 320a and one or more regions, such as region 302a, which does not include a lubrication body. In an embodiment, the regions 301a, 303a may alternate with regions, such as the regions 302a.

Figure 8:
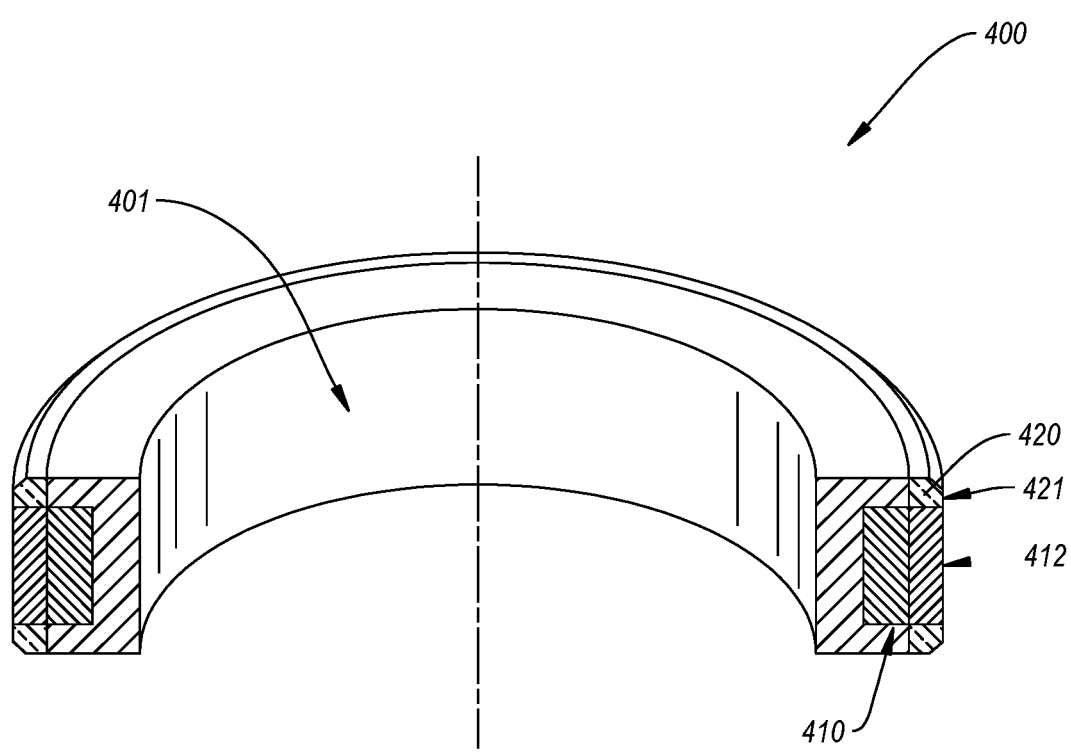
FIG. 8 is an isometric cutaway view of another radial bearing assembly according to an embodiment.

In some embodiments, a second radial bearing assembly may include at least one lubricant body. FIG. 8 illustrates a second radial bearing assembly 400 according to an embodiment. Except as otherwise described herein, the second radial bearing assembly 400 and its materials, elements, components, or features may be similar to or the same as any of the thrust-bearing assemblies 100, 100a, 100b, 100b', 100c, 100d, 100e, 100h, 100h' (FIGS. 1A-5B) and/or the first radial bearing assemblies 300, 300a (FIGS. 7A-7B) and their corresponding materials, elements, components, and features.

For example, the second radial bearing assembly 400 may include superhard bearing elements 410 (not all labeled) that may be similar to or identical to the superhard bearing elements 310 (FIG. 7A). In some embodiments, the superhard bearing elements 410 may have a superhard bearing surfaces 412 (not all labeled) that may have convex shapes (e.g., the superhard bearing surfaces 412 may lie on an imaginary cylindrical surface). Moreover, the second radial bearing assembly 400 may include lubricant body 420, which may laterally surround one, some, or all of the superhard bearing elements 410. In one or more embodiments, the second radial bearing assembly 400 may include an opening 401 that may accept a shaft or a similar machine element or component to which the second radial bearing assembly 400 may be secured.

As described above, the lubricant body 420 may include a lubrication surface 421. For example, the lubrication surface 421 may be continuous or interrupted. Furthermore, the lubrication surface 421 may lie approximately on the same imaginary surface as the superhard bearing surfaces 412 (e.g., the lubrication surface 421 may lie on an imaginary cylindrical surface). As mentioned above, the lubrication surface 421 may be urged or forced away from rotation axis 40 of the second radial bearing assembly 400 and/or may be pressed against an opposing bearing surface, thereby providing lubrication thereto (e.g., lubricant from the lubricant body 420 may be transferred to at least one opposing bearing surface).

Figure 9A:
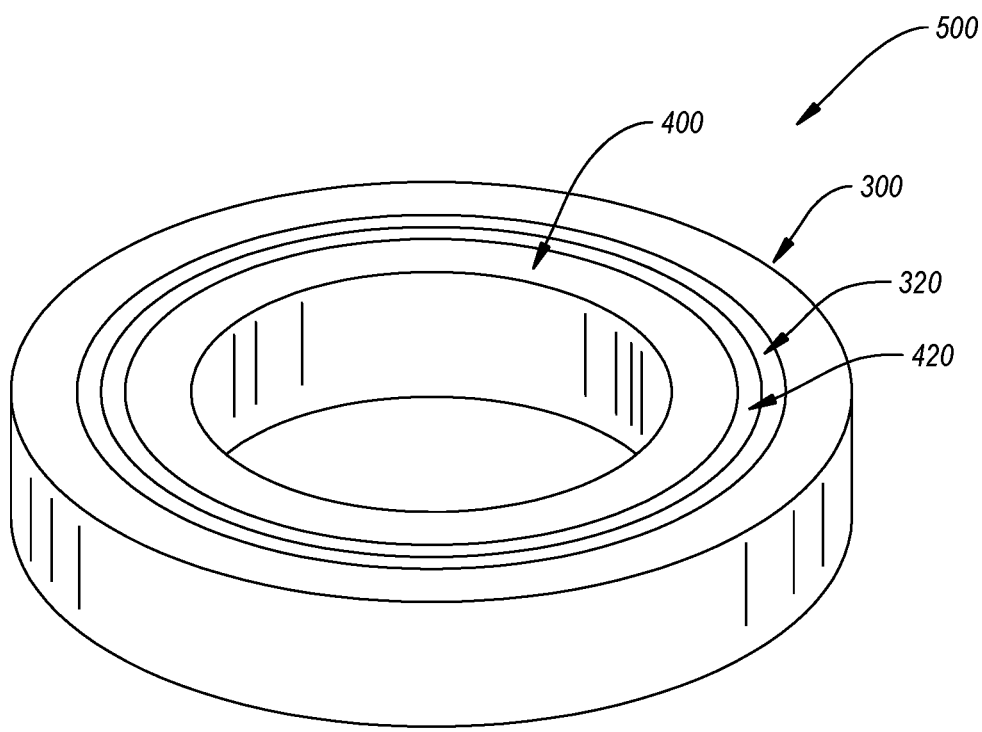
FIG. 9A is an isometric view of a radial bearing apparatus according to an embodiment.

In some embodiments, the bearing surface or multiple bearing surfaces opposing the superhard bearing surfaces 412 may be on an opposing radial bearing assembly. FIG. 9A illustrates a radial bearing apparatus including 500 that includes the first radial bearing assembly 300 engaged with the second radial bearing assembly 400. More specifically, the bearing surfaces of the first radial bearing assembly 300 may be at least partially engaged with and/or may at least partially contact the bearing surfaces of the second radial bearing assembly 400 during the use. It should be appreciated that the radial bearing apparatus may include any of the radial bearing features and/or assemblies described herein.

Generally, the first radial bearing assembly 300 and second radial bearing assembly 400 may rotate relative to each other. For example, the first radial bearing assembly 300 may be a stator, while the second radial bearing assembly 400 may be a rotor, or vice versa. In some embodiments, the first radial bearing assembly 300 and the second radial bearing assembly 400 may rotate at different speeds, thereby producing relative rotation between the first radial bearing assembly 300 and second radial bearing assembly 400 and respective superhard bearing surfaces thereof.

Also, in some embodiments, the lubricant body 320 may supply lubricant to the superhard bearing surfaces of the second radial bearing assembly 400. Also, in an embodiment, the lubricant body 420 may supply lubricant to the superhard bearing surfaces of the first radial bearing assembly 300. For example, the lubricant from the lubricant body 320 and/or lubricant body 420 may provide lubrication between and/or cooling for the superhard bearing surfaces of the first radial bearing assembly 300 and second radial bearing assembly 400.

Figure 9B:
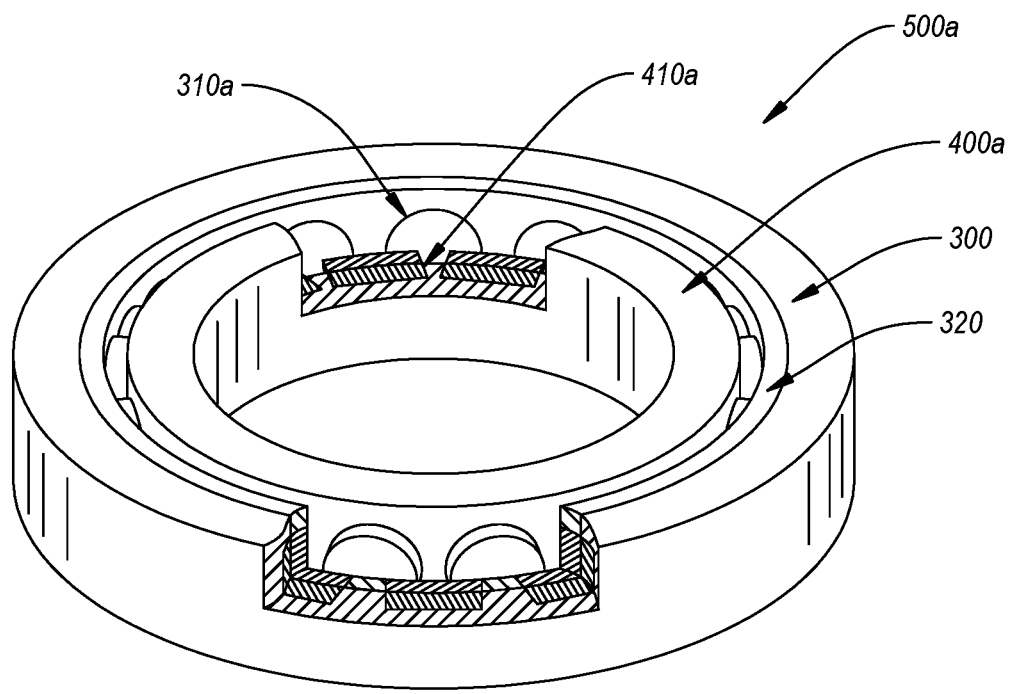
FIG. 9B is an isometric cutaway view of a radial bearing apparatus according to another embodiment.

Alternatively, only a first or a second radial bearing assembly of a radial bearing apparatus may include one or more lubrication bodies. FIG. 9B illustrates a radial bearing apparatus 500a that include a first radial bearing assembly 300 and a second radial bearing assembly 400a, according to an embodiment. Except as otherwise described herein, the radial bearing apparatus 500a and its materials, elements, components, or features may be similar to or the same as the radial bearing apparatus 500 and its corresponding materials, elements, components, and features.

For example, the second radial bearing assembly 400a may include no lubricant body in or surrounding superhard bearing elements 410a of the second radial bearing assembly 400a. In some embodiments, however, lubricant from the lubricant body 320 of the first radial bearing assembly 300 may be transferred onto at least one of the superhard bearing surfaces of the superhard bearing elements 410a during operation of the radial bearing apparatus 500a. As mentioned above, the superhard bearing surfaces of the superhard bearing elements 410a may be in at least partial contact with the superhard bearing surfaces of the superhard bearing elements 310a of the first radial bearing assembly 300, as the first radial bearing assembly 300 and second radial bearing assembly 400a rotate relative to each other. Moreover, at least one of the superhard bearing surfaces of the superhard bearing elements 410a may be in contact with the lubrication surface of the lubricant body 320 and may remove/distribute lubricant therefrom. For example, such lubricant may provide lubrication between and/or cooling of the superhard bearing surfaces of the first radial bearing assembly 300 and second radial bearing assembly 400a.

Figure 10:
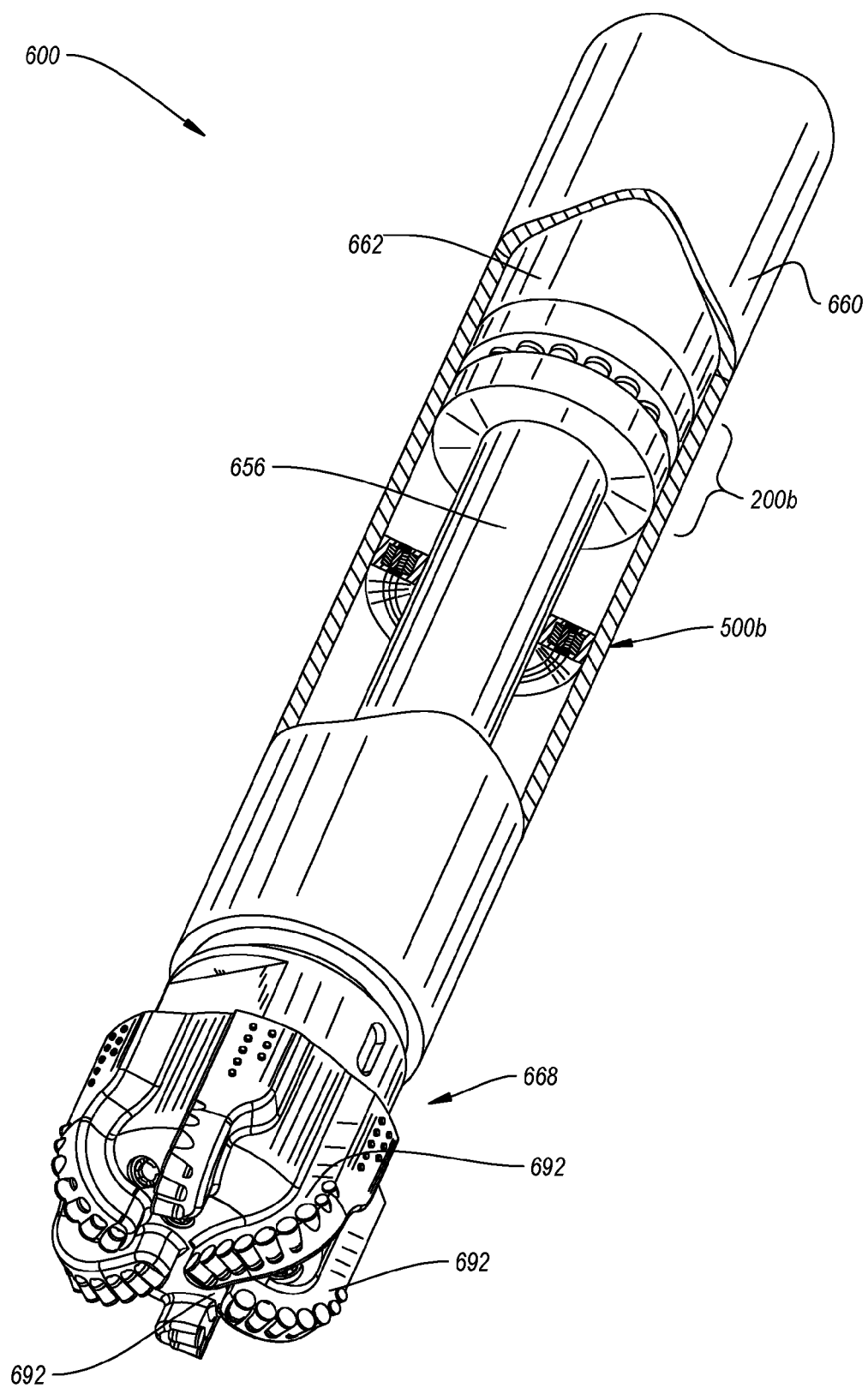
FIG. 10 is an isometric view of a subterranean drilling system according to an embodiment.

FIG. 10 is a schematic isometric cutaway view of a subterranean drilling system 600 according to an embodiment. The subterranean drilling system 600 may include a housing 660 enclosing a downhole drilling motor 662 (i.e., a motor, turbine, or any other device capable of rotating an output shaft) that may be operably connected to an output shaft 656. A thrust-bearing apparatus 200b may be operably coupled to the downhole drilling motor 662. The thrust-bearing apparatus 200b may be configured as any of the previously described thrust-bearing apparatus embodiments (e.g., thrust-bearing apparatus 200 shown in FIG. 6A).

Additionally or alternatively, the subterranean drilling system 600 may include a radial bearing apparatus 500b operably connected to the output shaft 656 and/or to the housing 660. The radial bearing apparatus 500b may be configured as any of the previously described radial bearing apparatus embodiments (e.g., the radial bearing apparatus 500 shown in FIG. 9A). For example, the radial bearing apparatus 500b may include first radial bearing assembly (e.g., a stator) and second radial bearing assembly (e.g., a rotor) that maybe operably connected to the housing 660 and to the output shaft 656, respectively.

A rotary drill bit 668 may be configured to engage a subterranean formation and drill a borehole and may be connected to the output shaft 656. The rotary drill bit 668 is a fixed-cutter drill bit and is shown comprising a bit body 690 having radially-extending and longitudinally-extending blades 692 with a plurality of PDCs secured to the blades 692. However, other embodiments may utilize different types of rotary drill bits, such as core bits and/or roller-cone bits. As the borehole is drilled, pipe sections may be connected to the subterranean drilling system first thrust-bearing assembly thrust-bearing apparatus 200b to form a drill string capable of progressively drilling the borehole to a greater size or depth within the earth.

In operation, drilling fluid may be circulated through the downhole drilling motor 662 to generate torque and rotate the output shaft 656 and the rotary drill bit 668 attached thereto so that a borehole may be drilled. A portion of the drilling fluid may also be used to lubricate opposing bearing surfaces of the stators and rotors of the radial bearing apparatus 500b and/or of the thrust-bearing apparatus 200b. In some operating conditions, as mentioned above, the drilling fluid may facilitate hydrodynamic operation of the radial bearing apparatus 500b and/or of the thrust-bearing apparatus 20b.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a support ring;
   a plurality of superhard bearing elements mounted on the support ring, each of the plurality of superhard bearing elements including a superhard bearing surface; and
   one or more lubricant bodies each of which includes graphite and are moveable relative to the superhard bearing surfaces of the plurality of superhard bearing elements, each of the one or more lubricant bodies including a lubrication surface.

2. The bearing assembly of claim 1 further comprising one or more biasing elements positioned adjacent to at least one of the one or more lubrication bodies and configured to move the at least one of the one or more lubrication bodies away from the support ring.

3. The bearing assembly of claim 2 wherein each of the one or more biasing elements includes a spring.

4. The bearing assembly of claim 1 wherein the one or more lubricant bodies include at least one lubricant body that laterally surrounds one or more of the plurality of superhard bearing elements.

5. The bearing assembly of claim 4 wherein the at least one lubricant body extends to a periphery of the support ring.

6. The bearing assembly of claim 4 wherein the at least one lubricant body laterally surrounds each of the plurality of superhard bearing elements.

7. The bearing assembly of claim 1 wherein the one or more lubricant bodies include at least one lubricant body that is located at least partially within at least one of the plurality of superhard bearing elements.

8. The bearing assembly of claim 1 wherein at least one of the plurality of superhard bearing elements includes multiple lubricant bodies of the one or more lubricant bodies located at least partially therein.

9. The bearing assembly of claim 1 wherein the one or more lubricant bodies include a chamfer extending between a periphery thereof and the lubrication surface.

10. The bearing assembly of claim 1 wherein the superhard bearing surfaces and the one or more lubricant surfaces lie substantially on the same imaginary surface.

11. A bearing assembly, comprising:
    a support ring;
    a plurality of superhard bearing elements mounted on the support ring, each of the plurality of superhard bearing elements including a superhard bearing surface;
    wherein each of the plurality of superhard bearing elements includes at least one lubricant body having a lubrication surface, the least one lubricant body being movable relative to the superhard bearing surface;
    wherein the at least one lubricant body includes graphite and one or more transition metals.

12. The bearing assembly of claim 11 wherein at least some of the plurality of superhard bearing elements each includes a biasing element positioned adjacent to the at least one lubrication body thereof and configured to move the at least one lubricant body away from the support ring.

13. The bearing assembly of claim 11 wherein the at least one lubricant body is located at least partially within a corresponding one of the plurality of superhard bearing elements.

14. The bearing assembly of claim 11 wherein the at least one lubricant body includes multiple lubricant bodies.

15. The bearing assembly of claim 11 wherein the superhard bearing surface and the at least one lubricant surface of a corresponding one of the plurality of superhard bearing elements lie substantially on the same imaginary surface.

16. The bearing assembly of claim 11 wherein the one or more transition metals include at least one of tungsten or molybdenum.

17. The bearing assembly of claim 11 wherein the one or more transition metals are included in one or more metal compounds.

18. The bearing assembly of claim 17 wherein the one or more metal compounds include at least one of tungsten disulfide or molybdenum disulfide.

19. A bearing apparatus, comprising:
   a rotor bearing assembly including one or more first bearing surfaces; and
   a stator bearing assembly including:
      a plurality of superhard bearing elements each including a second bearing surface; and
      one or more lubricant bodies including graphite and one or more transition metals and defining one or more lubrication surfaces, the one or more lubrication surfaces lying substantially on the same imaginary surface with the second bearing surfaces.

20. The bearing apparatus of claim 19 wherein the stator bearing assembly includes one or more urging elements configured to move the one or more lubricant bodies.

* * * * *